US010071693B2

(12) United States Patent
D'Angelo

(10) Patent No.: US 10,071,693 B2
(45) Date of Patent: Sep. 11, 2018

(54) ROOFTOP CARGO CARRYING SYSTEM

(71) Applicant: Yakima Products, Inc., Lake Oswego, OR (US)

(72) Inventor: Gian-Marco D'Angelo, Portland, OR (US)

(73) Assignee: Yakima Products, Inc., Lake Oswego, OR (US)

(*) Notice: Subject to any disclaimer, the term of this patent is extended or adjusted under 35 U.S.C. 154(b) by 115 days.

(21) Appl. No.: 15/176,107

(22) Filed: Jun. 7, 2016

(65) Prior Publication Data

US 2016/0362060 A1 Dec. 15, 2016

Related U.S. Application Data

(60) Provisional application No. 62/173,333, filed on Jun. 9, 2015, provisional application No. 62/175,192, filed on Jun. 12, 2015.

(51) Int. Cl.
*B60R 9/058* (2006.01)
*B60R 9/05* (2006.01)
(Continued)

(52) U.S. Cl.
CPC ............ *B60R 9/058* (2013.01); *B60R 9/05* (2013.01); *B60R 9/052* (2013.01); *B60R 2011/0059* (2013.01)

(58) Field of Classification Search
CPC ...................................... B60R 9/058
(Continued)

(56) References Cited

U.S. PATENT DOCUMENTS 488,395 A 12/1892 Justice
529,827 A 11/1894 Fonda
(Continued)

FOREIGN PATENT DOCUMENTS

AU 2003231667 A1 2/2004
AU 2006100386 A4 6/2006
(Continued)

OTHER PUBLICATIONS

Yakima Car Racks, Wing Bars and Locking RailRiders, 1997 Catalog, p. 9.
(Continued)

*Primary Examiner* — Justin Larson
(74) *Attorney, Agent, or Firm* — Kolisch Hartwell, P.C.

(57) ABSTRACT

A coupling assembly for connecting a rooftop cargo carrying system to a vehicle may include a coupler body. The coupler body may include a crossbar clamp configured to be coupled to a crossbar, the crossbar oriented transverse to a direction of vehicle travel. The coupling assembly may include a base connected to the coupler body configured to sit on a flush rail of a vehicle roof. The flush rail may be oriented generally parallel to the direction of vehicle travel. The coupling assembly may include a clip retention and adjustment mechanism connected to the coupler body with the clip retention and adjustment mechanism having an adjustment member. The clip retention and adjustment mechanism may be configured to interchangeably receive an inner clip and interchangeably receive an outer clip. The clip retention and adjustment mechanism may be further configured to rotate the received inner and outer clips with respect to the coupler body in order to grip inner and outer sides, respectively, of the flush rail by actuating the adjustment member.

16 Claims, 15 Drawing Sheets

(51) Int. Cl.
*B60R 9/052* (2006.01)
*B60R 11/00* (2006.01)

(58) Field of Classification Search
USPC .................................................. 224/331
See application file for complete search history.

(56) References Cited

U.S. PATENT DOCUMENTS

| | | | |
|---|---|---|---|
| 556,789 A | 3/1896 | Walker | |
| 576,351 A | 2/1897 | Penfield | |
| 586,681 A | 7/1897 | Douglas | |
| 607,024 A | 7/1898 | Durfee et al. | |
| 614,264 A | 11/1898 | Fletcher | |
| 615,264 A | 12/1898 | Du Pont | |
| 1,179,823 A | 4/1916 | Greene | |
| 1,789,458 A | 1/1931 | Bureau | |
| 2,206,328 A | 7/1940 | Martinek | |
| 2,248,170 A | 7/1941 | Hansen | |
| 2,302,300 A | 11/1942 | Davies | |
| 2,317,195 A | 4/1943 | Husted | |
| 2,415,286 A | 2/1947 | Hyde | |
| 2,431,400 A | 11/1947 | Iverson | |
| 2,536,797 A | 1/1951 | Cooke | |
| 2,551,218 A | 5/1951 | Menne | |
| 2,573,187 A | 10/1951 | Désilets | |
| 2,584,283 A | 2/1952 | Oliver et al. | |
| 2,613,020 A | 10/1952 | Berry | |
| 2,696,231 A | 12/1954 | Pardo | |
| 2,723,005 A | 11/1955 | Wink | |
| 2,729,499 A | 1/1956 | Eggum | |
| 2,816,672 A | 12/1957 | Facchini | |
| 2,988,253 A | 6/1961 | Menghi | |
| 3,001,679 A | 9/1961 | Canning et al. | |
| 3,042,240 A | 7/1962 | Cline | |
| 3,064,868 A | 11/1962 | Treydte | |
| 3,113,642 A | 12/1963 | Lay | |
| 3,116,836 A | 1/1964 | McCauley | |
| 3,155,249 A | 11/1964 | Johnson | |
| 3,186,569 A | 6/1965 | Roux | |
| 3,190,587 A | 6/1965 | Fries | |
| 3,221,960 A | 12/1965 | Gleason et al. | |
| 3,239,115 A | 3/1966 | Bott et al. | |
| 3,240,406 A | 3/1966 | Logan | |
| 3,276,085 A | 10/1966 | Spranger | |
| 3,300,171 A | 1/1967 | Walls | |
| 3,378,182 A | 4/1968 | McMiller | |
| RE26,538 E | 3/1969 | Bott | |
| RE26,539 E | 3/1969 | Bott | |
| 3,430,983 A | 3/1969 | Jones | |
| 3,460,694 A | 8/1969 | Simms | |
| 3,469,810 A | 9/1969 | Dorris | |
| 3,519,180 A | 7/1970 | Bott | |
| 3,529,737 A | 9/1970 | Daugherty | |
| 3,554,416 A | 1/1971 | Bott | |
| 3,581,962 A | 6/1971 | Osborn | |
| 3,596,788 A | 8/1971 | Willie | |
| 3,606,432 A | 9/1971 | Honatzis | |
| 3,615,069 A | 10/1971 | Bott | |
| 3,642,157 A | 2/1972 | Williams, Jr. | |
| 3,643,973 A | 2/1972 | Bott | |
| 3,677,195 A | 7/1972 | Prete, Jr. | |
| 3,677,451 A | 7/1972 | Burland | |
| 3,737,083 A | 6/1973 | Lund | |
| 3,740,034 A | 6/1973 | Scroggins | |
| 3,744,689 A | 7/1973 | Kjensmo | |
| 3,777,922 A | 12/1973 | Kirchmeyer | |
| 3,826,390 A | 7/1974 | Watson | |
| 3,828,993 A | 8/1974 | Carter | |
| 3,843,001 A | 10/1974 | Willis | |
| 3,848,784 A | 11/1974 | Shimano et al. | |
| 3,848,785 A | 11/1974 | Bott | |
| 3,858,774 A | 1/1975 | Friis | |
| 3,861,533 A | 1/1975 | Radek | |
| 3,892,455 A | 7/1975 | Sotolongo | |
| D238,771 S | 2/1976 | Spokus, Sr. | |
| 3,946,917 A | 3/1976 | Crawford et al. | |
| 3,951,320 A | 4/1976 | Bott | |
| 3,976,213 A | 8/1976 | Ball | |
| 3,993,167 A | 11/1976 | Reed | |
| 4,015,760 A | 4/1977 | Bott | |
| 4,022,362 A | 5/1977 | Revercomb | |
| 4,023,761 A | 5/1977 | Molis | |
| 4,034,879 A | 7/1977 | Cudmore | |
| 4,046,297 A | 9/1977 | Bland | |
| 4,050,616 A | 9/1977 | Mosow | |
| 4,055,284 A | 10/1977 | Bott | |
| 4,058,243 A | 11/1977 | Tappan | |
| 4,081,118 A | 3/1978 | Mason | |
| 4,085,763 A | 4/1978 | Thomas | |
| 4,089,448 A | 5/1978 | Traeger | |
| 4,099,658 A | 7/1978 | Bott | |
| 4,106,680 A | 8/1978 | Bott | |
| 4,114,409 A | 9/1978 | Scire | |
| 4,126,228 A | 11/1978 | Bala et al. | |
| 4,132,335 A | 1/1979 | Ingram | |
| 4,156,497 A | 5/1979 | Bott | |
| 4,162,755 A | 7/1979 | Bott | |
| 4,165,827 A | 8/1979 | Bott | |
| 4,170,322 A | 10/1979 | Bott | |
| 4,171,077 A | 10/1979 | Richard, Jr. | |
| 4,174,794 A | 11/1979 | Bott | |
| 4,175,682 A | 11/1979 | Bott | |
| 4,182,471 A | 1/1980 | Bott | |
| 4,213,593 A | 7/1980 | Weik | |
| 4,213,729 A | 7/1980 | Cowles et al. | |
| 4,222,508 A | 9/1980 | Bott | |
| 4,239,139 A | 12/1980 | Bott | |
| 4,245,764 A | 1/1981 | Kowalski et al. | |
| 4,264,025 A | 4/1981 | Ferguson et al. | |
| 4,269,339 A | 5/1981 | Bott | |
| 4,274,568 A | 6/1981 | Bott | |
| 4,274,569 A | 6/1981 | Winter et al. | |
| 4,274,570 A | 6/1981 | Bott | |
| 4,277,009 A | 7/1981 | Bott | |
| 4,288,055 A * | 9/1981 | Gump | B60R 9/058 224/331 |
| 4,295,587 A | 10/1981 | Bott | |
| 4,323,182 A | 4/1982 | Bott | |
| 4,326,655 A | 4/1982 | Gradek et al. | |
| D264,203 S | 5/1982 | Bott | |
| 4,342,411 A | 8/1982 | Bott | |
| 4,350,380 A | 9/1982 | Williams | |
| 4,358,037 A | 11/1982 | Heideman | |
| 4,364,500 A | 12/1982 | Bott | |
| 4,372,469 A | 2/1983 | Kowalski et al. | |
| 4,401,247 A | 8/1983 | Zoor | |
| 4,402,442 A | 9/1983 | Martino | |
| 4,403,716 A | 9/1983 | Carlson et al. | |
| 4,406,386 A | 9/1983 | Rasor et al. | |
| 4,427,141 A | 1/1984 | Bott | |
| 4,428,517 A | 1/1984 | Bott | |
| 4,431,123 A | 2/1984 | Bott | |
| 4,432,478 A | 2/1984 | Bott | |
| 4,432,479 A * | 2/1984 | Graber | B60R 9/058 224/322 |
| 4,433,804 A | 2/1984 | Bott | |
| 4,437,597 A | 3/1984 | Doyle | |
| 4,440,333 A | 4/1984 | Bott | |
| 4,442,961 A | 4/1984 | Bott | |
| 4,448,336 A | 5/1984 | Bott | |
| 4,448,337 A | 5/1984 | Cronce | |
| 4,449,656 A | 5/1984 | Wouden | |
| 4,460,116 A | 7/1984 | Bott | |
| 4,469,261 A | 9/1984 | Stapleton et al. | |
| 4,473,178 A | 9/1984 | Bott | |
| 4,487,348 A | 12/1984 | Mareydt | |
| 4,501,385 A | 2/1985 | Bott | |
| 4,516,709 A | 5/1985 | Bott | |
| 4,524,893 A | 6/1985 | Cole | |
| 4,531,879 A * | 7/1985 | Horowitz | B60R 9/08 224/310 |
| D282,155 S | 1/1986 | Bott | |
| 4,586,638 A | 5/1986 | Prescott et al. | |
| 4,588,117 A | 5/1986 | Bott | |

(56) References Cited

U.S. PATENT DOCUMENTS

| | | |
|---|---|---|
| 4,588,118 A * | 5/1986 | Ferenc ............... B60Q 1/2611 224/329 |
| 4,589,622 A | 5/1986 | Hutter |
| 4,616,771 A | 10/1986 | Heideman |
| 4,629,104 A | 12/1986 | Jacquet |
| 4,630,990 A | 12/1986 | Whiting |
| 4,639,039 A | 1/1987 | Nichols |
| 4,640,450 A | 2/1987 | Gallion et al. |
| 4,673,119 A | 6/1987 | Bott |
| 4,684,048 A | 8/1987 | Bott |
| 4,684,049 A | 8/1987 | Maby et al. |
| 4,688,706 A | 8/1987 | Thulin |
| 4,700,873 A | 10/1987 | Young |
| 4,702,398 A | 10/1987 | Seager |
| 4,702,401 A | 10/1987 | Graber et al. |
| RE32,583 E | 1/1988 | Bott |
| 4,717,165 A | 1/1988 | Johnson |
| 4,721,239 A | 1/1988 | Gibbs, III et al. |
| D294,340 S | 2/1988 | Robson |
| 4,724,692 A | 2/1988 | Turin et al. |
| 4,751,891 A | 6/1988 | Wilson |
| 4,754,905 A | 7/1988 | Bott |
| 4,757,929 A | 7/1988 | Nelson |
| 4,770,329 A | 9/1988 | Kamaya |
| 4,778,092 A | 10/1988 | Grace |
| 4,789,145 A | 12/1988 | Wenrich |
| D300,734 S | 4/1989 | Kruitbosch |
| 4,817,838 A | 4/1989 | Kamaya |
| 4,823,997 A | 4/1989 | Krieger |
| 4,830,249 A | 5/1989 | Mirenda et al. |
| 4,830,250 A | 5/1989 | Newbold et al. |
| 4,838,467 A | 6/1989 | Bott et al. |
| 4,848,112 A | 7/1989 | Graber et al. |
| 4,848,794 A | 7/1989 | Mader et al. |
| 4,875,608 A | 10/1989 | Graber |
| 4,877,168 A | 10/1989 | Bott |
| 4,877,169 A | 10/1989 | Grim |
| 4,887,754 A | 12/1989 | Boyer et al. |
| 4,890,777 A | 1/1990 | Bott |
| 4,892,279 A | 1/1990 | Lafferty et al. |
| 4,895,096 A | 1/1990 | Goodwin et al. |
| 4,899,917 A | 2/1990 | Bott |
| 4,911,348 A | 3/1990 | Rasor et al. |
| 4,917,428 A | 4/1990 | Sola |
| 4,917,429 A | 4/1990 | Giger |
| 4,934,572 A | 6/1990 | Bowman et al. |
| 4,944,439 A | 7/1990 | Bott |
| D310,196 S | 8/1990 | Bott |
| 4,960,356 A | 10/1990 | Wrenn |
| 4,961,524 A | 10/1990 | Hunts |
| 4,964,287 A | 10/1990 | Gaul |
| 4,967,945 A | 11/1990 | Bott |
| 4,972,983 A | 11/1990 | Bott |
| 4,976,123 A | 12/1990 | Ceron et al. |
| 4,993,615 A | 2/1991 | Arvidsson |
| 4,995,538 A | 2/1991 | Marengo |
| 4,997,332 A | 3/1991 | Johnson |
| 5,005,390 A | 4/1991 | Giannini et al. |
| 5,025,932 A | 6/1991 | Jay |
| 5,025,967 A | 6/1991 | Cronce et al. |
| 5,029,740 A | 7/1991 | Cox |
| 5,033,709 A | 7/1991 | Yuen |
| 5,037,019 A | 8/1991 | Sokn |
| 5,038,988 A | 8/1991 | Thulin |
| 5,042,705 A | 8/1991 | Johansson |
| 5,052,605 A | 10/1991 | Johansson |
| 5,056,700 A | 10/1991 | Blackburn et al. |
| 5,065,921 A | 11/1991 | Mobley |
| 5,118,020 A | 6/1992 | Piretti |
| 5,118,125 A | 6/1992 | Plunkett |
| 5,119,654 A | 6/1992 | Ceron et al. |
| 5,123,147 A | 6/1992 | Blair |
| 5,131,669 A | 7/1992 | Kinnamon et al. |
| 5,136,709 A | 8/1992 | Shirakabe et al. |
| 5,137,195 A | 8/1992 | Walter |
| 5,143,267 A | 9/1992 | Cucheran et al. |
| 5,158,425 A | 10/1992 | Bott |
| 5,169,042 A | 12/1992 | Ching |
| 5,169,044 A | 12/1992 | Englander |
| 5,170,920 A | 12/1992 | Corrente et al. |
| 5,201,487 A | 4/1993 | Epplett |
| 5,201,911 A | 4/1993 | Lee |
| 5,203,483 A | 4/1993 | Cucheran |
| 5,205,453 A | 4/1993 | Pudney et al. |
| 5,207,365 A | 5/1993 | Bott |
| 5,215,233 A | 6/1993 | Baldeck |
| 5,217,149 A | 6/1993 | Simonett |
| 5,226,341 A | 7/1993 | Shores |
| 5,226,570 A | 7/1993 | Pedrini |
| 5,226,634 A | 7/1993 | Rudy, Jr. et al. |
| 5,230,449 A | 7/1993 | Collins et al. |
| 5,232,134 A | 8/1993 | Allen |
| 5,232,138 A | 8/1993 | Cucheran |
| 5,236,153 A | 8/1993 | LaConte |
| 5,244,101 A | 9/1993 | Palmer et al. |
| 5,253,913 A | 10/1993 | Metivier |
| 5,257,710 A | 11/1993 | Cropley |
| 5,259,542 A | 11/1993 | Newbold et al. |
| 5,275,319 A | 1/1994 | Ruana |
| 5,275,320 A | 1/1994 | Duemmler |
| 5,282,560 A | 2/1994 | Ozog |
| 5,282,562 A | 2/1994 | Legault |
| 5,284,282 A | 2/1994 | Mottino |
| 5,291,763 A | 3/1994 | Cuisinot |
| 5,294,033 A | 3/1994 | Duemmler |
| 5,314,104 A | 5/1994 | Lee |
| 5,320,264 A | 6/1994 | Weir |
| 5,326,007 A | 7/1994 | Pudney et al. |
| D349,680 S | 8/1994 | Powell |
| D350,527 S | 9/1994 | Parlor, Sr. |
| 5,346,355 A | 9/1994 | Riemer |
| 5,360,150 A | 11/1994 | Praz |
| 5,375,750 A | 12/1994 | Mandarino et al. |
| 5,385,285 A | 1/1995 | Cucheran et al. |
| 5,388,938 A | 2/1995 | Helton |
| 5,397,042 A | 3/1995 | Pedrini |
| 5,400,938 A | 3/1995 | Kolodziej et al. |
| 5,416,957 A | 5/1995 | Renzi, Sr. et al. |
| 5,419,479 A | 5/1995 | Evels et al. |
| 5,433,356 A | 7/1995 | Russell |
| 5,433,550 A | 7/1995 | Huber |
| 5,435,475 A | 7/1995 | Hudson et al. |
| 5,442,840 A | 8/1995 | Ewald |
| 5,443,190 A | 8/1995 | Cucheran et al. |
| 5,445,300 A | 8/1995 | Eipper et al. |
| 5,452,831 A | 9/1995 | Linnhoff |
| 5,456,396 A | 10/1995 | Allen |
| 5,456,512 A | 10/1995 | Gibbs et al. |
| 5,458,268 A | 10/1995 | Hill |
| 5,471,714 A | 12/1995 | Olson |
| 5,474,218 A | 12/1995 | Arsenault, Jr. et al. |
| 5,476,201 A | 12/1995 | Hall et al. |
| 5,492,258 A | 2/1996 | Brunner |
| 5,499,762 A | 3/1996 | Lee |
| D369,140 S | 4/1996 | Sills |
| 5,511,894 A | 4/1996 | Ng |
| 5,516,017 A | 5/1996 | Arvidsson |
| 5,526,971 A | 6/1996 | Despain |
| 5,535,930 A | 7/1996 | Lee |
| 5,549,231 A | 8/1996 | Fletcher et al. |
| D373,988 S | 9/1996 | Johnson |
| 5,553,761 A | 9/1996 | Audoire et al. |
| 5,556,221 A | 9/1996 | Brunner |
| 5,570,825 A | 11/1996 | Cona |
| 5,577,650 A | 11/1996 | Stapleton |
| 5,582,044 A | 12/1996 | Bolich |
| 5,598,959 A | 2/1997 | Lorensen et al. |
| 5,617,617 A | 4/1997 | Gustin |
| 5,624,063 A | 4/1997 | Ireland |
| 5,628,336 A | 5/1997 | Lee |
| 5,647,522 A | 7/1997 | Routh |
| 5,657,913 A | 8/1997 | Cucheran et al. |
| D386,145 S | 11/1997 | Staller |
| 5,692,659 A | 12/1997 | Reeves |

(56) References Cited

U.S. PATENT DOCUMENTS

| | | | |
|---|---|---|---|
| 5,695,164 A | 12/1997 | Hartmann et al. |
| 5,697,629 A | 12/1997 | Guild |
| 5,701,628 A | 12/1997 | Morad |
| 5,709,521 A | 1/1998 | Glass et al. |
| 5,730,343 A | 3/1998 | Settelmayer |
| 5,738,258 A | 4/1998 | Farrow et al. |
| 5,762,248 A | 6/1998 | Englander et al. |
| 5,769,291 A | 6/1998 | Chasan |
| 5,769,292 A | 6/1998 | Cucheran et al. |
| 5,775,557 A | 7/1998 | Arvidsson |
| 5,779,119 A | 7/1998 | Talbot et al. |
| 5,785,474 A * | 7/1998 | Kinouchi ............... B60R 9/058 224/329 |
| 5,806,735 A | 9/1998 | Christiansson et al. |
| 5,810,226 A | 9/1998 | Lee |
| 5,820,002 A | 10/1998 | Allen |
| 5,826,765 A | 10/1998 | Rak et al. |
| 5,833,074 A | 11/1998 | Phillips |
| 5,845,828 A | 12/1998 | Settelmayer |
| 5,848,743 A | 12/1998 | Derecktor |
| 5,862,966 A | 1/1999 | Mehls |
| 5,868,621 A | 2/1999 | Parsons |
| 5,875,947 A | 3/1999 | Noel et al. |
| 5,924,614 A | 7/1999 | Kuntze et al. |
| 5,944,198 A | 8/1999 | Ihalainen |
| 5,951,231 A | 9/1999 | Allen |
| 5,984,155 A | 11/1999 | Stapleton |
| 5,988,403 A | 11/1999 | Robideau |
| 5,992,645 A | 11/1999 | West |
| 5,992,805 A | 11/1999 | Tanner |
| 5,996,736 A | 12/1999 | Stankiewicz |
| 6,010,048 A | 1/2000 | Settelmayer |
| 6,015,074 A | 1/2000 | Snavely et al. |
| 6,019,266 A | 2/2000 | Johnson |
| 6,050,467 A | 4/2000 | Drouillard et al. |
| 6,053,336 A | 4/2000 | Reeves |
| 6,062,450 A | 5/2000 | Noel et al. |
| 6,102,265 A | 8/2000 | Stapleton |
| 6,105,841 A | 8/2000 | Aftanas |
| 6,112,965 A | 9/2000 | Lundgren |
| 6,131,781 A | 10/2000 | Murray |
| 6,164,507 A | 12/2000 | Dean et al. |
| 6,176,404 B1 | 1/2001 | Fourel |
| 6,182,876 B1 | 2/2001 | Moliner |
| 6,189,868 B1 | 2/2001 | Santelli, Jr. |
| 6,193,252 B1 | 2/2001 | Lin |
| 6,244,483 B1 | 6/2001 | McLemore et al. |
| 6,273,311 B1 | 8/2001 | Pedrini |
| 6,276,747 B1 | 8/2001 | Ogawa et al. |
| 6,279,802 B1 | 8/2001 | Hickman et al. |
| 6,283,310 B1 | 9/2001 | Dean et al. |
| 6,286,738 B1 | 9/2001 | Robins et al. |
| 6,296,162 B1 | 10/2001 | Englander et al. |
| 6,305,589 B1 | 10/2001 | Chimenti et al. |
| 6,357,643 B1 | 3/2002 | Janner et al. |
| 6,385,822 B1 | 5/2002 | Dean et al. |
| D460,401 S | 7/2002 | Andersson |
| 6,422,441 B1 | 7/2002 | Settelmayer et al. |
| 6,439,397 B1 | 8/2002 | Reeves |
| 6,460,743 B2 | 10/2002 | Edgerly et al. |
| D467,220 S | 12/2002 | Walstrom et al. |
| 6,488,249 B1 | 12/2002 | Girardi et al. |
| 6,491,192 B2 | 12/2002 | Aki |
| 6,491,195 B1 | 12/2002 | McLemore et al. |
| 6,494,351 B1 | 12/2002 | Dean |
| 6,516,985 B1 | 2/2003 | Lundgren |
| 6,523,730 B2 | 2/2003 | Anderson |
| 6,523,731 B1 | 2/2003 | Pedrini |
| 6,557,931 B1 | 5/2003 | Tremmel et al. |
| 6,561,398 B1 | 5/2003 | Cole et al. |
| 6,568,644 B2 | 5/2003 | Pedersen |
| 6,622,898 B1 | 9/2003 | Wang |
| 6,640,979 B1 | 11/2003 | Mayfield |
| 6,648,300 B2 | 11/2003 | Chamoun |
| 6,662,982 B1 | 12/2003 | Päkkilä |
| 6,681,971 B2 | 1/2004 | Laverack et al. |
| D487,720 S | 3/2004 | Thomas |
| 6,715,653 B2 | 4/2004 | DeCosta |
| 6,722,541 B1 | 4/2004 | Aftanas et al. |
| 6,736,300 B2 | 5/2004 | Deakin |
| 6,736,301 B1 | 5/2004 | Huang |
| 6,761,297 B1 | 7/2004 | Pedrini |
| 6,766,929 B2 | 7/2004 | Karlsson |
| 6,779,696 B2 | 8/2004 | Aftanas et al. |
| 6,793,186 B2 | 9/2004 | Pedersen |
| 6,796,471 B2 | 9/2004 | Aftanas et al. |
| 6,817,500 B2 | 11/2004 | Neaux |
| 6,840,418 B2 | 1/2005 | Robins et al. |
| 6,843,394 B2 | 1/2005 | Aki |
| 6,845,893 B2 | 1/2005 | Nelson |
| 6,845,922 B2 | 1/2005 | Stark |
| 6,857,545 B2 | 2/2005 | McLemore et al. |
| 6,868,998 B2 | 3/2005 | Dean |
| 6,892,912 B1 | 5/2005 | MacNeil |
| 6,892,913 B1 | 5/2005 | Andersson |
| 6,905,053 B2 | 6/2005 | Allen |
| 6,918,521 B2 | 7/2005 | Settelmayer et al. |
| 6,938,782 B2 | 9/2005 | Dean et al. |
| 6,968,986 B1 | 11/2005 | Lloyd et al. |
| 6,972,042 B2 | 12/2005 | Benson |
| 6,976,615 B2 | 12/2005 | Dean |
| 6,997,657 B1 | 2/2006 | Saward |
| 7,000,811 B2 | 2/2006 | Gilstrap et al. |
| 7,004,365 B2 | 2/2006 | Ingram |
| 7,036,698 B2 | 5/2006 | Allen |
| 7,044,347 B1 | 5/2006 | Pedrini |
| 7,051,909 B2 | 5/2006 | Gibson |
| 7,104,430 B2 | 9/2006 | Reeves |
| 7,117,768 B1 | 10/2006 | Stoeppelwerth |
| 7,131,561 B2 | 11/2006 | Humes |
| 7,175,218 B1 | 2/2007 | Keene |
| 7,182,233 B1 | 2/2007 | Graffy et al. |
| 7,201,436 B2 | 4/2007 | Ludwig et al. |
| 7,222,763 B2 | 5/2007 | Pedrini |
| 7,234,617 B2 | 6/2007 | Weaver et al. |
| 7,240,816 B2 | 7/2007 | Tsai |
| D561,680 S | 2/2008 | Foley et al. |
| D562,217 S | 2/2008 | Davis et al. |
| D562,218 S | 2/2008 | Foley et al. |
| 7,328,824 B2 | 2/2008 | Smith et al. |
| D564,438 S | 3/2008 | Moore |
| D566,034 S | 4/2008 | Davis et al. |
| 7,357,283 B2 | 4/2008 | Settelmayer |
| 7,367,481 B2 | 5/2008 | Barbara |
| 7,404,504 B2 | 7/2008 | Settelmayer |
| 7,413,143 B2 | 8/2008 | Frantz et al. |
| 7,416,098 B2 | 8/2008 | Settelmayer et al. |
| 7,427,049 B2 | 9/2008 | Kennedy et al. |
| 7,481,344 B2 | 1/2009 | Näslund et al. |
| 7,641,249 B2 | 1/2010 | Jung |
| 7,648,151 B2 | 1/2010 | Pedrini |
| 7,721,925 B1 | 5/2010 | Graffy et al. |
| 7,726,528 B2 | 6/2010 | Foley |
| 7,757,914 B2 | 7/2010 | Book et al. |
| D622,208 S | 8/2010 | Sautter et al. |
| 7,784,656 B2 | 8/2010 | Morrill et al. |
| D623,117 S | 9/2010 | Farber |
| 7,815,084 B2 | 10/2010 | Allen et al. |
| D633,030 S | 2/2011 | Robertson |
| D635,086 S | 3/2011 | Shen |
| D638,778 S | 5/2011 | Giddens |
| D642,113 S | 7/2011 | Farber |
| 7,975,888 B2 | 7/2011 | Settelmayer |
| 8,020,737 B2 | 9/2011 | Sweeney |
| 8,021,169 B1 | 9/2011 | Smith |
| 8,087,557 B2 | 1/2012 | Larsson et al. |
| 8,104,651 B2 | 1/2012 | Bingham |
| 8,113,398 B2 | 2/2012 | Sautter et al. |
| 8,136,708 B2 | 3/2012 | Sautter et al. |
| 8,136,709 B2 | 3/2012 | Jeli et al. |
| D656,887 S | 4/2012 | Bogoslofski et al. |
| 8,196,789 B2 | 6/2012 | Kraeuter et al. |
| 8,210,407 B2 | 7/2012 | Sautter et al. |
| 8,235,267 B2 | 8/2012 | Sautter et al. |

(56) References Cited

U.S. PATENT DOCUMENTS

| | | |
|---|---|---|
| 8,245,893 B2 | 8/2012 | Sautter et al. |
| D669,017 S | 10/2012 | Robertson |
| 8,333,311 B2 | 12/2012 | Hubbard |
| 8,393,507 B2 * | 3/2013 | Aftanas .................. B60R 9/058 224/309 |
| 8,393,508 B2 | 3/2013 | Sautter et al. |
| 8,408,853 B2 | 4/2013 | Womack et al. |
| 8,505,793 B2 | 8/2013 | Foley |
| 8,534,518 B2 * | 9/2013 | Shen ....................... B60R 9/058 224/322 |
| 8,544,707 B2 | 10/2013 | Hubbard |
| 8,668,181 B2 | 3/2014 | Dazet et al. |
| D703,605 S | 4/2014 | Sautter et al. |
| 8,763,870 B2 | 7/2014 | Davis |
| D717,722 S | 11/2014 | Cagampang et al. |
| 8,925,775 B2 | 1/2015 | Sautter et al. |
| 9,102,274 B2 | 8/2015 | Hubbard |
| 9,132,782 B2 | 9/2015 | Hubbard |
| 9,409,527 B2 | 8/2016 | Hubbard |
| 2001/0013528 A1 | 8/2001 | Chimenti et al. |
| 2002/0053581 A1 | 5/2002 | Peschmann et al. |
| 2002/0125282 A1 | 9/2002 | Laverack et al. |
| 2003/0071097 A1 | 4/2003 | Dean |
| 2003/0164390 A1 | 9/2003 | Higginbotham, III |
| 2003/0178457 A1 | 9/2003 | Wang |
| 2003/0222112 A1 | 12/2003 | McLemore et al. |
| 2004/0118886 A1 | 6/2004 | Mirshafiee et al. |
| 2004/0211801 A1 | 10/2004 | Barbara |
| 2004/0238582 A1 | 12/2004 | Pedrini |
| 2005/0029320 A1 | 2/2005 | Chimenti et al. |
| 2005/0051585 A1 | 3/2005 | Kamiya et al. |
| 2005/0061842 A1 | 3/2005 | Tsai |
| 2005/0077335 A1 | 4/2005 | Bourne |
| 2005/0145639 A1 | 7/2005 | Viklund et al. |
| 2005/0205626 A1 | 9/2005 | Dean |
| 2005/0284905 A1 | 12/2005 | Naslund et al. |
| 2006/0000859 A1 | 1/2006 | Frischer |
| 2006/0029483 A1 | 2/2006 | Allen et al. |
| 2006/0049324 A1 | 3/2006 | Smith et al. |
| 2006/0060622 A1 | 3/2006 | Prenger |
| 2006/0086766 A1 | 4/2006 | Settelmayer |
| 2006/0208022 A1 | 9/2006 | Karlsson |
| 2006/0249466 A1 | 11/2006 | Wang |
| 2006/0273122 A1 | 12/2006 | Bogoslofski et al. |
| 2006/0273123 A1 | 12/2006 | Settelmayer |
| 2006/0273124 A1 | 12/2006 | Bogoslofski |
| 2006/0289577 A1 | 12/2006 | Malone |
| 2007/0036628 A1 | 2/2007 | Womack et al. |
| 2007/0108243 A1 | 5/2007 | Bingham |
| 2007/0119887 A1 | 5/2007 | Foley |
| 2007/0119888 A1 | 5/2007 | Chuang |
| 2007/0164065 A1 | 7/2007 | Davis |
| 2008/0000940 A1 | 1/2008 | Wang |
| 2008/0029563 A1 | 2/2008 | Malone |
| 2008/0034561 A1 * | 2/2008 | Emmerling ............. B60R 9/055 24/514 |
| 2008/0053926 A1 | 3/2008 | Foley |
| 2008/0099522 A1 | 5/2008 | Clausen et al. |
| 2008/0101883 A1 | 5/2008 | Derecktor |
| 2008/0164292 A1 | 7/2008 | Farney |
| 2008/0193265 A1 | 8/2008 | Sautter et al. |
| 2008/0257924 A1 | 10/2008 | Kmita et al. |
| 2009/0014489 A1 | 1/2009 | Settelmayer et al. |
| 2009/0120984 A1 | 5/2009 | Sautter et al. |
| 2009/0159624 A1 | 6/2009 | Johnson et al. |
| 2009/0184189 A1 | 7/2009 | Soderberg et al. |
| 2009/0236382 A1 | 9/2009 | Sautter et al. |
| 2010/0078454 A1 | 4/2010 | Sautter et al. |
| 2010/0237116 A1 | 9/2010 | Hubbard |
| 2010/0282799 A1 | 11/2010 | Hubbard |
| 2010/0308091 A1 | 12/2010 | Hubbard |
| 2011/0132946 A1 | 6/2011 | Sautter et al. |
| 2011/0139838 A1 | 6/2011 | Sautter et al. |
| 2011/0139841 A1 | 6/2011 | Sautter et al. |
| 2011/0139842 A1 | 6/2011 | Sautter et al. |
| 2011/0174853 A1 | 7/2011 | Hubbard |
| 2011/0290836 A1 | 12/2011 | Shen |
| 2013/0020361 A1 | 1/2013 | Sautter et al. |
| 2013/0022440 A1 | 1/2013 | Sautter et al. |
| 2013/0037585 A1 | 2/2013 | Hubbard et al. |
| 2013/0062379 A1 | 3/2013 | Sautter et al. |
| 2013/0062383 A1 | 3/2013 | Jeli |
| 2013/0062385 A1 | 3/2013 | Pedrini |
| 2013/0175308 A1 | 7/2013 | Sautter et al. |
| 2013/0200121 A1 | 8/2013 | Hubbard |
| 2013/0214020 A1 | 8/2013 | Pedrini |
| 2013/0284779 A1 | 10/2013 | Sautter et al. |
| 2014/0028007 A1 | 1/2014 | Pfeiffer et al. |
| 2014/0097220 A1 | 4/2014 | Sautter et al. |
| 2014/0144958 A1 | 5/2014 | Sautter et al. |
| 2014/0144959 A1 | 5/2014 | Sautter et al. |
| 2014/0144960 A1 | 5/2014 | Condon et al. |
| 2014/0158728 A1 | 6/2014 | Sautter et al. |
| 2014/0158729 A1 | 6/2014 | Pedrini |
| 2014/0166709 A1 | 6/2014 | Hubbard |
| 2015/0069102 A1 | 3/2015 | Hubbard |
| 2015/0151686 A1 * | 6/2015 | Chang ..................... B60R 9/045 224/321 |
| 2015/0232038 A1 | 8/2015 | Robertson |
| 2015/0239402 A1 | 8/2015 | Hubbard |
| 2015/0274084 A1 * | 10/2015 | Sarges .................... B60R 9/058 224/315 |
| 2016/0339849 A1 * | 11/2016 | Almhill ................... B60R 9/058 |
| 2016/0362060 A1 * | 12/2016 | D'Angelo ............... B60R 9/058 |

FOREIGN PATENT DOCUMENTS

| | | |
|---|---|---|
| AU | 2008301329 B2 | 8/2012 |
| AU | 348922 | 5/2013 |
| AU | 2008304016 B2 | 1/2014 |
| CA | 971140 A | 7/1975 |
| CN | 87104266 A | 3/1988 |
| CN | 2445963 Y | 9/2001 |
| CN | 101559737 A | 10/2009 |
| CN | 101559738 A | 10/2009 |
| CN | 101868375 A | 10/2010 |
| CN | 201677818 U | 12/2010 |
| CN | 102177047 A | 9/2011 |
| CN | 101861257 B | 11/2012 |
| CN | 101868376 B | 3/2013 |
| CN | 102975661 A | 3/2013 |
| CN | 102177047 B | 2/2015 |
| DE | 2940095 A1 | 4/1981 |
| DE | 2950449 A1 | 6/1981 |
| DE | 3034226 A1 | 4/1982 |
| DE | 3201409 A1 | 9/1983 |
| DE | 3209912 A1 | 10/1983 |
| DE | 3614740 A1 | 11/1987 |
| DE | 3626479 A1 | 2/1988 |
| DE | 3637856 A1 | 5/1988 |
| DE | 8801618 U1 | 8/1988 |
| DE | 3912692 A1 | 11/1989 |
| DE | 4229268 A1 | 3/1994 |
| DE | 4423607 C1 | 6/1995 |
| DE | 20007760 U1 | 8/2000 |
| DE | 20309766 U1 | 9/2003 |
| DE | 202005007566 U1 | 7/2005 |
| EP | 0019873 B1 | 10/1982 |
| EP | 0151907 A2 | 8/1985 |
| EP | 0193501 A2 | 9/1986 |
| EP | 0433495 A1 | 12/1989 |
| EP | 0482650 A1 | 4/1992 |
| EP | 0504588 A1 | 9/1992 |
| EP | 0511179 A1 | 10/1992 |
| EP | 0646074 B1 | 10/1996 |
| EP | 0398885 B2 | 6/1997 |
| EP | 0869879 A | 10/1998 |
| EP | 0894672 A1 | 2/1999 |
| EP | 0945307 A2 | 9/1999 |
| EP | 0989029 A1 | 3/2000 |
| EP | 1285817 A2 | 2/2003 |
| EP | 1340652 A1 | 9/2003 |
| EP | 1340653 A2 | 9/2003 |
| EP | 1422940 A1 | 8/2004 |

(56) References Cited

FOREIGN PATENT DOCUMENTS

| | | |
|---|---|---|
| EP | 1205358 B1 | 7/2005 |
| EP | 1568542 A1 | 8/2005 |
| EP | 1712420 A1 | 10/2006 |
| EP | 2334514 A | 6/2011 |
| EP | 2437961 A | 2/2012 |
| EP | 2507095 A | 10/2012 |
| EP | 2303641 B1 | 11/2012 |
| EP | 002172445-0001 | 4/2013 |
| EP | 002231878-0001 | 7/2013 |
| EP | 002343582-0001 | 1/2014 |
| EP | 002343756-0001 | 1/2014 |
| EP | 2200869 B1 | 4/2014 |
| EP | 2200867 B1 | 6/2014 |
| EP | 2758275 A | 7/2014 |
| EP | 2200868 B1 | 8/2014 |
| FR | 1400231 A | 4/1965 |
| FR | 2481209 A1 | 10/1981 |
| FR | 2501601 A1 | 9/1982 |
| FR | 2519305 A1 | 7/1983 |
| FR | 2600953 A1 | 1/1988 |
| FR | 2624808 A2 | 6/1989 |
| FR | 2632595 A1 | 12/1989 |
| FR | 2711346 A1 | 4/1995 |
| FR | 2752793 A1 | 3/1998 |
| GB | 886743 A | 1/1962 |
| GB | 1045619 A | 10/1966 |
| GB | 1311367 A | 3/1973 |
| GB | 2257463 A | 1/1993 |
| GB | 2277309 A | 10/1994 |
| GB | 2303344 A | 2/1997 |
| GB | 2475916 A | 6/2011 |
| JP | 63-53143 A | 3/1988 |
| JP | 9-20181 A | 1/1997 |
| JP | 10-250488 A | 9/1998 |
| JP | 2000-318538 A | 11/2000 |
| MX | 2011012988 A | 3/2012 |
| NZ | 551764 A | 3/2009 |
| NZ | 561809 A | 11/2009 |
| NZ | 561860 A | 4/2010 |
| NZ | 561811 A | 6/2010 |
| NZ | 571287 A | 3/2011 |
| NZ | 592162 A | 7/2012 |
| TW | 201111201 A | 4/2011 |
| WO | 9110581 A1 | 7/1991 |
| WO | 9202385 A1 | 2/1992 |
| WO | 9410007 A2 | 5/1994 |
| WO | 9624509 A1 | 8/1996 |
| WO | 9638336 A1 | 12/1996 |
| WO | 9702976 A1 | 1/1997 |
| WO | 9708017 A1 | 3/1997 |
| WO | 9810959 A1 | 3/1998 |
| WO | 9954168 A1 | 10/1999 |
| WO | 03006277 A1 | 1/2003 |
| WO | 2005021332 A1 | 3/2005 |
| WO | 2005102013 A2 | 11/2005 |
| WO | 2009038479 A1 | 3/2009 |
| WO | 2009038480 A1 | 3/2009 |
| WO | 2009041828 A1 | 4/2009 |
| WO | 2009158358 A1 | 12/2009 |
| WO | 2009158360 A1 | 12/2009 |
| WO | 2010030198 A1 | 3/2010 |
| WO | 2010141944 A1 | 12/2010 |
| WO | 2010144369 A1 | 12/2010 |
| WO | 2010148011 A1 | 12/2010 |
| WO | 2011084075 A1 | 7/2011 |
| WO | 2013036939 A1 | 3/2013 |
| WO | 2013040267 A1 | 3/2013 |
| WO | 2013164692 A2 | 11/2013 |
| WO | 2013165640 A1 | 11/2013 |
| WO | 2014022435 A1 | 2/2014 |
| WO | WO 2015117990 A1 * | 8/2015 ............ B60R 9/058 |

OTHER PUBLICATIONS

Roof Mounted Bike Racks sold by Bike Racks Plus. [Retrieved on Mar. 20, 2007]. © 2002-2005. Retrieved from the Internet <URL: http://www.bike-racks-plus.com/Roof_Mounted_Bike_Racks_y.htm>, 3 pages.

Rack Attack Portland's Blog, "Another hit from Yakima! The all new factory-compatible FrontLoader upright bike rack", Mar. 29, 2010, Retrieved from the Internet on Oct. 11, 2012, URL: http://rackattackportland.wordpress.com/2010/03/29another-hit-from-yakima-the-all-new-factory-compatible-frontloader-upright-bike-rack/, 3 pages.

Yakima FrontLoader upright bike rack review, Apr. 17, 2010, Retrieved from the Internet on Oct. 11, 2012, URL:http://carracks.blogspot.nl/2010/04/yakima-frontloader-upright-bike-rack.html, 2 pages.

ORS Racks direct.com, "Yakima FrontLoader Bike Rack Review Video by ORS Racks Direct", May 19, 2010, Retrieved from the Internet on Oct. 11, 2012, URL:http://www.youtube.com/watch?v=cu8rHM90Rdw, 9 pages.

Heinlen, Jerry, "Yakima FrontLoader Recall Information", Apr. 28, 2011, Retrieved from the Internet on Oct. 11, 2012, URL:http://firecall.yakima.com, 2 pages.

Yakima, "Frontloader", Oct. 11, 2012, Retrieved from the Internet on Oct. 11, 2012, URL:http://yakima.com/shop/bike/roof/frontloader#pr-header-8002103, 5 pages.

* cited by examiner

ROOFTOP CARGO CARRYING SYSTEM

CROSS-REFERENCES

This application is based upon and claims the benefit under 35 U.S.C. § 119(e) of U.S. Provisional Patent Application Ser. No. 62/173,333, filed on Jun. 9, 2015, and U.S. Provisional Patent Application Ser. No. 62/175,192, filed on Jun. 12, 2015, which are incorporated herein, in their entireties, for all purposes.

The following related applications and materials are incorporated by reference, in their entireties, for all purposes: U.S. Pat. No. 6,905,053; U.S. Pat. No. 8,333,311; U.S. Pat. No. 8,393,508; U.S. Pat. No. 8,544,707; U.S. Pat. No. 9,132,782; U.S. patent application Ser. No. 15/167,774; and U.S. patent application Ser. No. 15/172,043.

FIELD

This disclosure relates to systems and methods for coupling rooftop racks to roofs of vehicles. More specifically, the disclosed embodiments relate to crossbar-to-vehicle couplers and related clamping systems.

INTRODUCTION

Popularity of recreational activities continues to grow, with a corresponding growth in the need for carrying recreational equipment and cargo on vehicles. Accordingly, various equipment carriers and accessories have been developed over the years, for recreational items such as bicycles, skis, surf boards, standup paddle boards, kayaks, and the like. Many such carriers and accessories are supported on rooftop racks.

Meanwhile, the number of different vehicle rooftop configurations has grown as well, with various shapes, sizes, and features depending on the make and model of the vehicle. For example, rooftop rails may be flush on the roof, raised, or not present at all. Similarly, rooftops themselves may be relatively flat or curved, and a width of the roof may change from front to back.

Rooftop racks typically include crossbars mounted to the vehicle roof, and the crossbars themselves may be of various shapes and sizes, from square to round to aerodynamic.

With all this variation, rooftop rack systems must typically incorporate a myriad of components customized to fit each style of roof and rooftop feature. A need exists for a simplified system of crossbars, support towers, and connection features, with a reduction in customized components.

SUMMARY

The coupling assembly with interchangeable inner and outer clips, as well as related systems and methods according to the present teachings, allow attachment of roof racks, including crossbars, to vehicle roof including flush roof rails.

In some embodiments, a coupling assembly for connecting a rooftop cargo carrying system to a vehicle may include a coupler body. The coupler body may include a crossbar clamp configured to be coupled to a crossbar, the crossbar oriented transverse to a direction of vehicle travel. The coupling assembly may include a base connected to the coupler body configured to sit on a flush rail of a vehicle roof. The flush rail may be oriented generally parallel to the direction of vehicle travel. The coupling assembly may include a clip retention and adjustment mechanism connected to the coupler body with the clip retention and adjustment mechanism having an adjustment member. The clip retention and adjustment mechanism may be configured to interchangeably receive an inner clip and interchangeably receive an outer clip. The clip retention and adjustment mechanism may be further configured to rotate the received inner and outer clips with respect to the coupler body in order to grip inner and outer sides, respectively, of the flush rail by actuating the adjustment member.

In some embodiments, a rack for carrying cargo on top of a vehicle may include a crossbar and a pair of coupling assemblies configured to mount the crossbar on top of a vehicle such that a long axis of the crossbar is substantially horizontal and generally perpendicular to a longitudinal axis of the vehicle. Each coupling assembly may include a coupler body, a base connected to the coupler body, and a clip retention and adjustment mechanism connected to the coupler body. The coupler body may include a crossbar clamp configured to be coupled to a crossbar, the crossbar oriented transverse to the longitudinal axis of the vehicle. The base may be configured to sit on a flush rail of a vehicle roof, the flush rail oriented generally parallel to the longitudinal axis of the vehicle. The base may be configured to rotate with respect to the coupler body about a base pivot axis oriented generally parallel to the flush rail. The clip retention and adjustment mechanism may be configured to grip inner and outer sides of a flush rail with inner and outer clips, respectively, by rotating at least one of the inner and outer clips relative to the coupler body around a clip pivot axis oriented generally parallel to the base pivot axis.

In some embodiments, a method of removably attaching a coupling assembly for use in a rooftop cargo carrying system to a flush roof rail of a vehicle may include disposing the coupling assembly on the flush roof rail of the vehicle. The coupling assembly may include a base connected to a coupler body, with the base abutting a top side of the flush roof rail. The method may include removably coupling an inner clip of a set of inner clips to a clip retention and adjustment mechanism connected to the coupler body, with the inner clip configured to abut an inner side of the flush roof rail. The method may include removably coupling an outer clip of a set of outer clips to the clip retention and adjustment mechanism, with the outer clip configured to abut an outer side of the flush roof rail. The method may further include actuating an adjustment member of the clip retention and adjustment mechanism. Actuating the adjustment member may include rotating the inner clip relative to the coupler body and toward the outer clip in order to grip the inner side of the flush rail and rotating the outer clip relative to the coupler body and toward the inner clip in order to grip the outer side of the flush rail.

Features, functions, and advantages may be achieved independently in various embodiments of the present disclosure, or may be combined in yet other embodiments, further details of which can be seen with reference to the following description and drawings.

DETAILED DESCRIPTION

Various embodiments of a support tower having interchangeable inner clips and interchangeable outer clips are described below and illustrated in the associated drawings. Unless otherwise specified, the support tower and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar devices and methods. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Definitions

The following definitions apply herein, unless otherwise indicated.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

The terms "inboard," "outboard," "forward," "aft," and the like are intended to be understood in the context of a host vehicle on which systems described herein may be mounted or otherwise attached. Terms regarding lateral orientation or positioning may be considered relative to an imaginary central vertical plane dividing the vehicle into left and right sides. For example, "outboard" may indicate a relative position that is laterally farther from the central vertical plane, or a direction that is away from the central vertical plane. Conversely, "inboard" may indicate a direction toward the central vertical plane, or a relative position that is closer to the central vertical plane. Similarly, "forward" means toward the front of the vehicle, and "aft" means toward the rear of the vehicle. In the absence of a host vehicle, the same directional terms may be used as if the vehicle were present. For example, even when viewed in isolation, a crossbar may have a "forward" edge, based on the fact that the edge in question would be installed facing the front portion of a host vehicle.

Overview of a Roof Rack System

Figure 1:
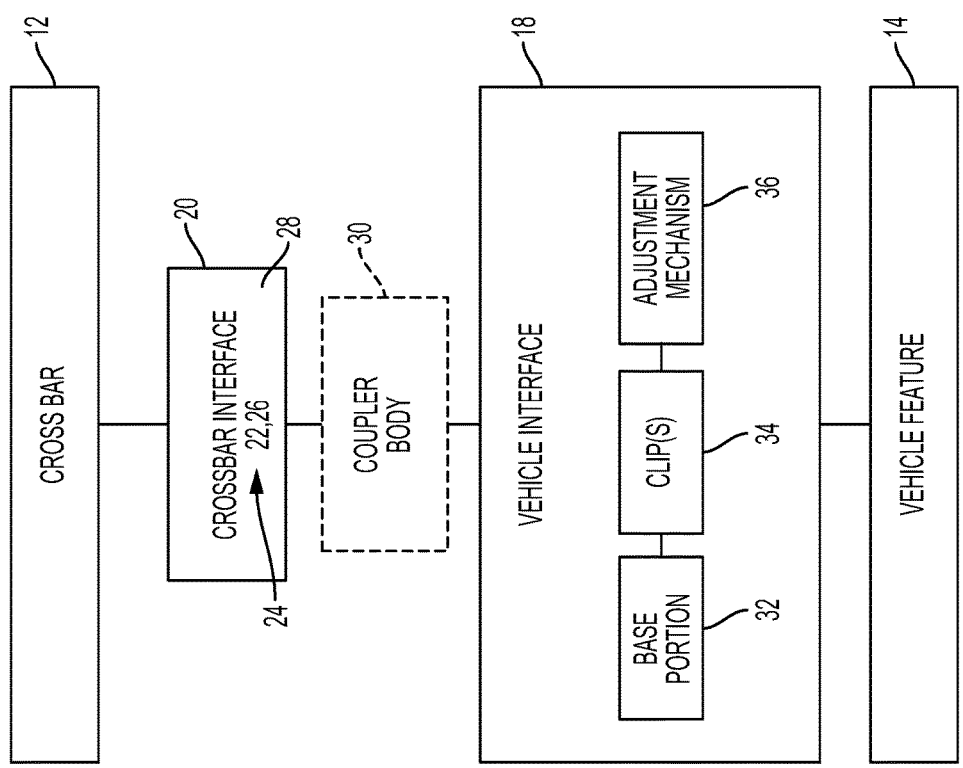
FIG. 1 is a schematic representation of a vehicle roof rack system for carrying cargo on top of a vehicle.

In general, and with reference to FIG. 1, a vehicle roof rack system 10 may include any suitable combination of components configured to removably and securely affix a selected crossbar to a vehicle rooftop. The crossbar is supported at either end by a pair of supports having features that facilitate attachment to corresponding feature(s) on the specific host vehicle. The crossbar supports may also be referred to as support towers, feet, coupling assemblies or mounts, and are referred to herein as couplers. A versatile and efficient system may be provided to fit a selected crossbar to the wide range of vehicle rooftops present in the marketplace.

Accordingly, roof rack system 10 may include one or more types of crossbars 12 suitable for use on a range of vehicles. Each type of crossbar 12 may include any suitable crossbar configured to be mounted transverse to the longitudinal axis of a vehicle, across a rooftop, and to support loads placed thereon. For example, a crossbar 12 may support a bicycle carrier, ski carrier, kayak carrier, and/or the like. Crossbars are typically mounted on a vehicle in pairs, such that a forward and an aft crossbar are present on the host vehicle for proper load carrying. Crossbars 12 may have any suitable cross section, such as round, square, teardrop, aerodynamic, and/or any other suitable shape or combination of shapes. Specific embodiments of crossbars 12 are described in further detail below.

Crossbars 12 are supported by attaching or fastening each of the crossbars to one or more specific vehicle features 14. Vehicles come in many shapes and sizes, with a corresponding array of roof topologies. Vehicle features 14, to which the crossbars may be attached, can include raised rails running along lateral sides of a rooftop, flush rails with no space between the rails and the roof, channels or hard points on the roof, side edges or gutters of a naked roof, etc. and/or the like.

To fasten the outboard ends of the crossbars to features 14, system 10 may include one or more couplers 16, also referred to as supports, towers, feet, or mounts, as mentioned above. Each coupler 16 may include any suitable vehicle interface 18 configured to attach, clamp, and/or removably connect to one or more vehicle features 14. Each coupler 16 may also include any suitable crossbar interface 20 configured to provide an attachment point or mount for a crossbar 12.

In some examples, crossbar interface 20 may include a universal interface for connecting a variety of crossbars. Each specific crossbar 12 may include or be associated with a crossbar connector 22 (also referred to as an adapter) configured to comprise a crossbar-specific bar clamp 24 when combined with a crossbar seat 26. Crossbar interface 20 may include a threaded bolt protruding upward from support 16. In this example, crossbar connector 22 may include a threaded portion for receiving the threaded bolt, as well as a holder portion for gripping, grasping, or grabbing onto the specific crossbar. Various crossbar connectors may each be attachable, interchangeably, to the same threaded bolt of the interface.

Bar clamp 24 may be used to removably and securely attach crossbar 12 to coupler 16. Accordingly, crossbar interface 20 of coupler 16 includes a crossbar (or bar) clamp actuator 28 configured to tighten, draw together, or otherwise cause clamp 24 to securingly engage the crossbar. Bar clamp actuator 28 may include a manual actuator or manual actuating mechanism. Illustrative examples of bar clamp actuators 28 are described in detail below.

Crossbar connector 22 and/or crossbar seat 26 may be grouped or provided with crossbar 12 to form a kit suitable for connecting to remaining elements of crossbar interface 20 of one or more different couplers 16. In other examples, crossbar connector 22 and/or crossbar seat 26 may be grouped or provided with coupler 16, to form a customized coupler suitable for connecting to a specific crossbar 12. From these examples, it should be clear that selected combinations of subcomponents of system 10 may be provided independently or separately, and combined or assembled as appropriate (e.g., for a specific vehicle).

In some examples, coupler 16 may include a coupler body or body portion 30 providing structural and/or other functional aspects of the coupler, e.g., locking devices, environmental, aesthetic, and/or aerodynamic outer housing features, internal support structure, etc. Vehicle interface 18 and/or crossbar interface 20 may be attached, unitary with, and/or coupled to coupler body portion 30. Alternatively or additionally, crossbar interface 20 and vehicle interface 18 may be coupled to each other.

Vehicle interface 18 may include any suitable structure and/or device configured to removably attach to a given vehicle feature (or features) 14. For example, vehicle interface 18 may include a clamp, hook, bolt, clip, strap, and/or the like, and/or any combination of these. To provide an efficient and versatile system, a selected number of vehicle interface types may be provided, some having modifiable or selectable components for further customization. Specific examples of vehicle interfaces 18 are mentioned in the examples below.

In some examples, vehicle interface 18 may include a base or base portion 32 configured to sit on or abut the vehicle feature 14. The base portion may have a fixed orientation relative to the coupler body 30 or may be movable with respect to the coupler body. The base portion may rotate or pivot with respect to the coupler body around a pivot or rotation axis. The rotation axis may be oriented perpendicular to a long axis of the crossbar 12 and/or parallel to the longitudinal axis of the vehicle.

Base portion 32 may include a base pad configured to make contact with the vehicle feature. The base pad may prevent damage to the vehicle. System 10 may include a variety of base pads with each base pad corresponding to a particular vehicle or set of vehicles and each of the base pads configured to be coupled to the remainder of the base portion.

In some embodiments, vehicle interface 18 may include one or more clips 34 configured to grip or grasp vehicle feature 14. For example, if vehicle feature 14 is a roof rail secured to the top of the vehicle, the vehicle interface may include a pair of clips 34 configured to grip the inboard and outboard sides, respectively, of the roof rail. In examples, if vehicle feature 14 is an edge portion of a naked roof of a vehicle, the vehicle interface may include a single clip 34 configured to grip the edge portion of the roof.

The one or more clips 34 may be of a set of clips, where the specific clip used is chosen for the specific vehicle in question. For example, in cases where vehicle feature 14 is a roof rail, a shape of the selected clips may be adapted to conform to the shape of the inboard and outboard sides of the roof rail. In other examples where the vehicle feature 14 is an edge portion of a naked roof, the shape of the selected clip may be adapted to conform to the edge portion of the roof without interfering with operation of a door.

Vehicle interface 18 may have a common clip retention mechanism 36 capable of receiving and holding any of the set of available clips. Retention mechanism may also be referred to as an adjustment mechanism or assembly 36, as mechanism 36 may allow for adjustment of the one or more clips 34 relative to the coupler body 30. The retention and adjustment mechanism may allow for angular adjustment around a rotation axis, linear adjustment along a translation axis, or a combination of linear and angular adjustment for any or all of the one or more clips 34.

Accordingly, system 10 may allow a user to choose a crossbar 12, select a coupler 16 having a vehicle interface 18 appropriate for attachment to vehicle feature 14 of the user's vehicle, and clamp the crossbar to the support using a corresponding clamp comprising crossbar connector 22 and crossbar seat 26. A user may further couple the vehicle interface to the vehicle feature by adjusting the position of one or more clips 34 with the retention and adjustment mechanism 36.

Figure 2:
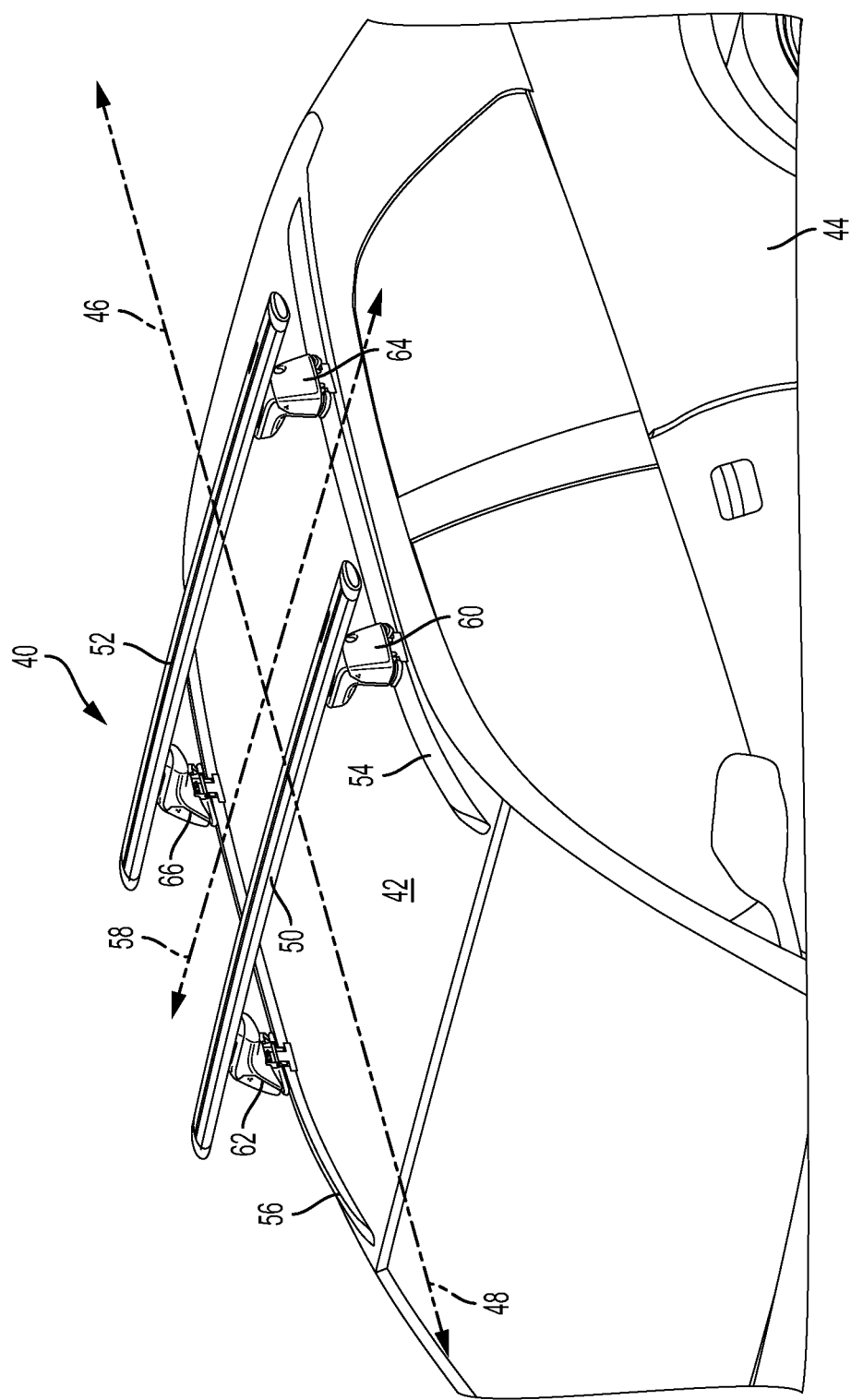
FIG. 2 is an isometric view of an embodiment of a vehicle roof rack system, showing the system attached to the roof of a vehicle.

Turning to FIG. 2, a specific example of a roof rack 40 is depicted, attached to an illustrative roof 42 of a vehicle 44. Roof rack 40 is a selected example of roof rack 10, described above. Accordingly, similar components may be labeled with similar reference numbers. Rack 40 may be used for carrying cargo and/or cargo-specific accessories on top of vehicle 44. Vehicle 44 has a longitudinal axis 46 generally coinciding with (e.g., running parallel to) a direction of vehicular travel 48.

Rack 40 includes a pair of crossbars 50 and 52 having aerodynamic shapes and attached to flush rail features 54 and 56 of vehicle roof 42. Each crossbar is supported and mounted on vehicle 44 by a respective pair of couplers configured to mount the crossbar on top of the vehicle with the crossbar substantially perpendicular to longitudinal axis 46. Accordingly, crossbars 50 and 52 are substantially parallel to each other and oriented across a width of the vehicle roof, as generally indicated by a lateral axis 58 in FIG. 2. Crossbar 50 is mounted on top of the vehicle by couplers 60 and 62, and crossbar 52 is mounted on top of the vehicle using couplers 64 and 66. In this example, couplers 60, 62, 64, 66 have a double-clip style vehicle interface configured to clamp to the flush bar vehicle features. Other styles may be suitable, and other vehicle features may be present.

Examples, Components, and Alternatives

The following sections describe selected aspects of exemplary couplers, crossbar clamp actuators, crossbar clamps, clip retention and adjustment assemblies, and related systems and/or methods. The examples in these sections are intended for illustration and should not be interpreted as limiting the entire scope of the present disclosure. Each section may include one or more distinct inventions, and/or contextual or related information, function, and/or structure.

Illustrative Crossbar Clamps

Figure 3:
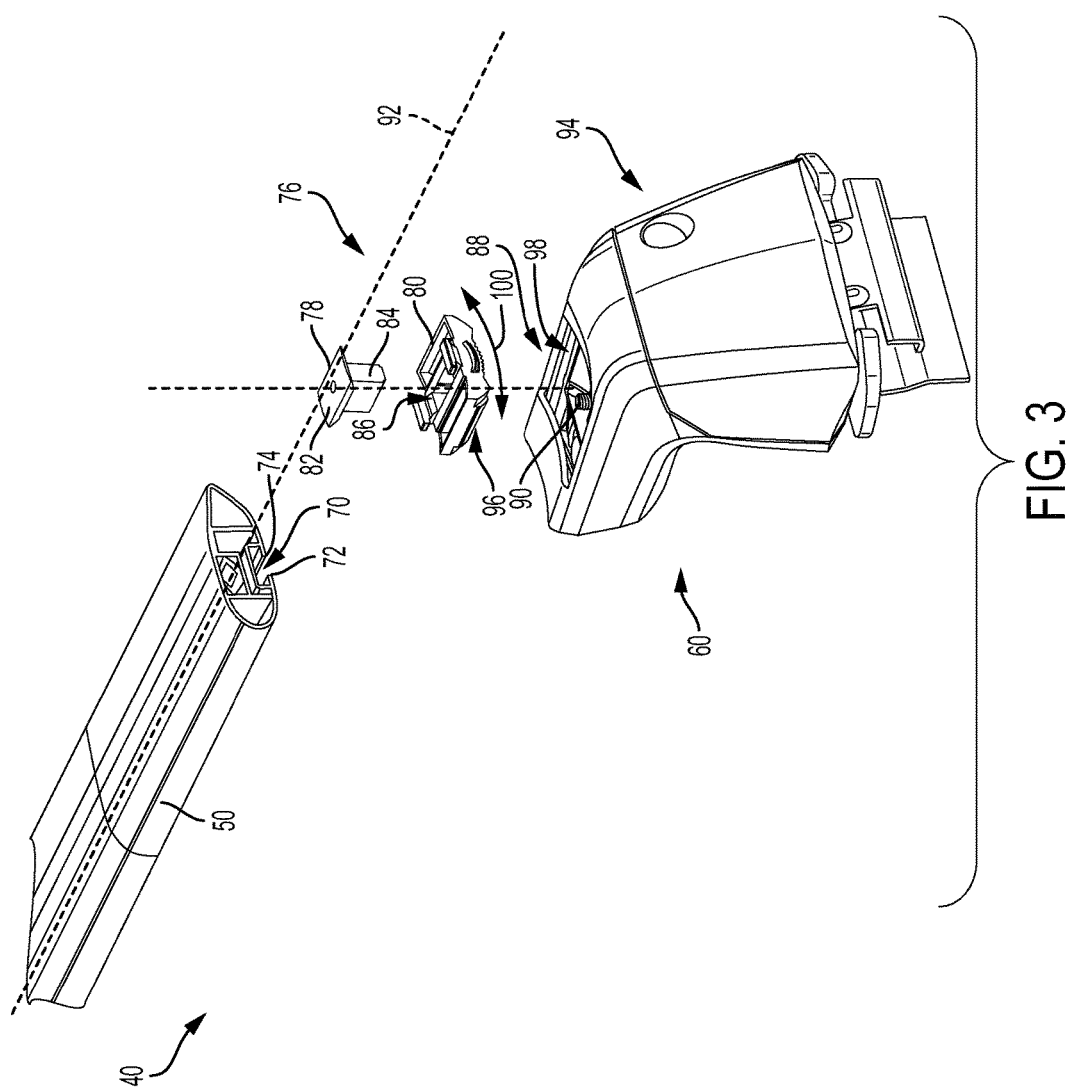
FIG. 3 is an exploded view of a portion of the vehicle roof rack system of FIG. 2, showing hardware for coupling a support tower to a T-slot underneath a crossbar.
Figure 4:
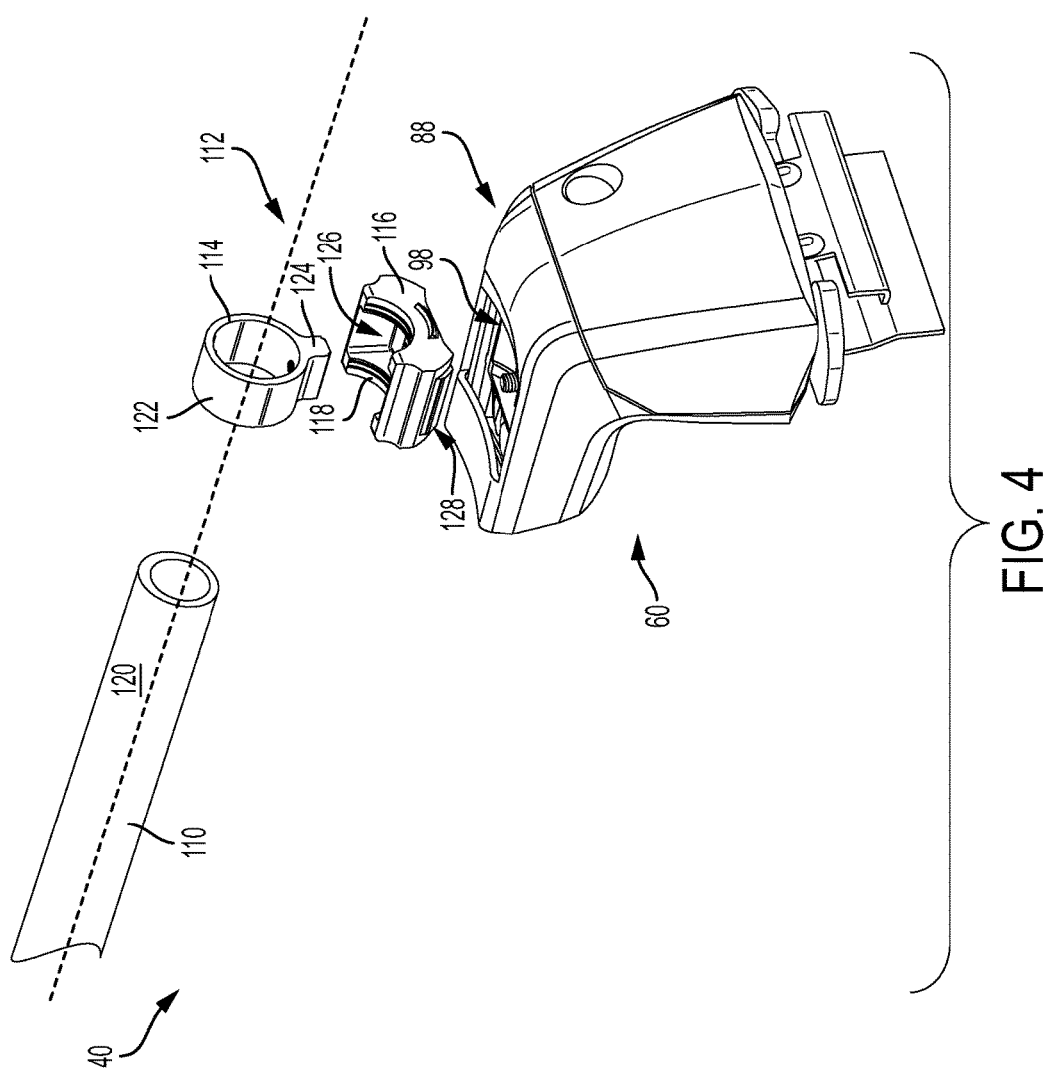
FIG. 4 is an exploded view of a portion of another embodiment of a vehicle roof rack system, showing hardware for coupling a support tower to a round crossbar.
Figure 5:
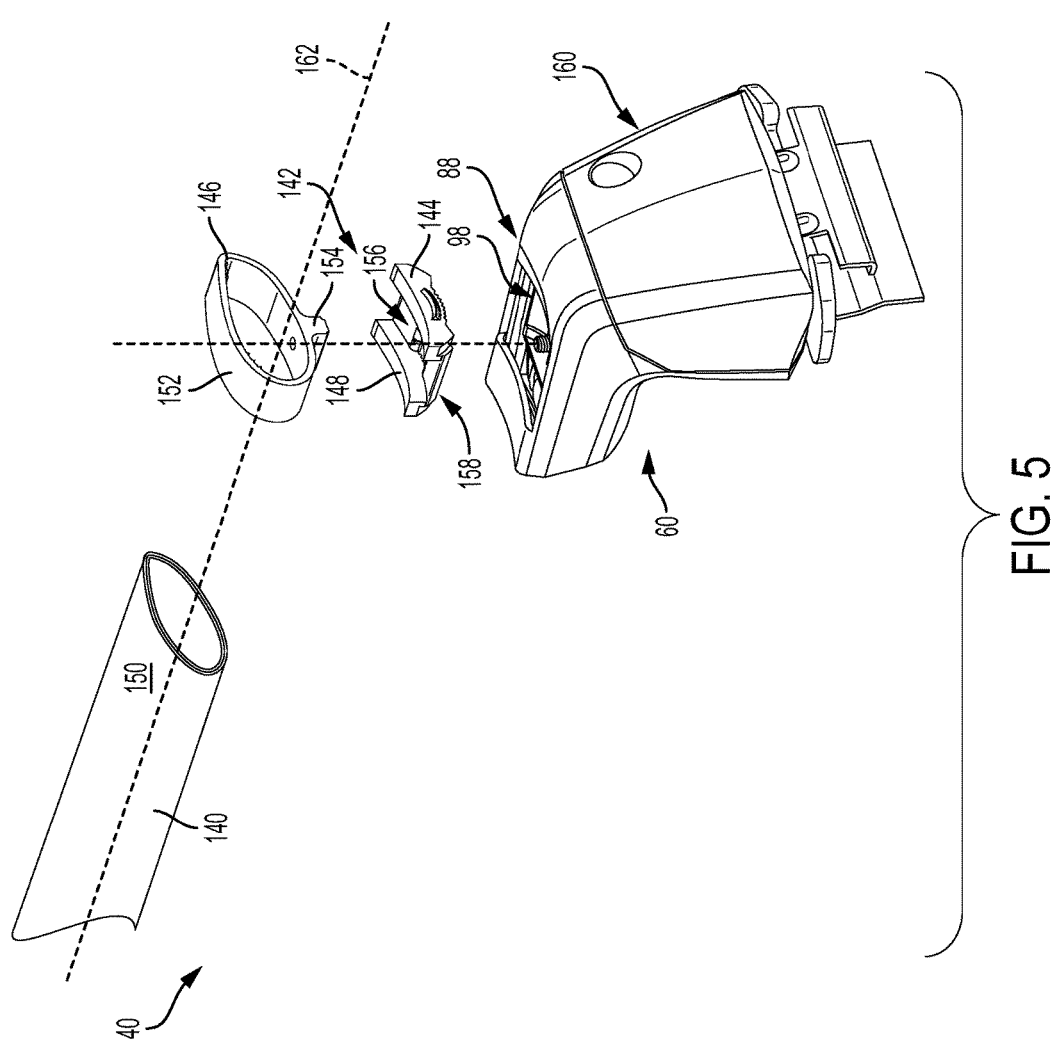
FIG. 5 is an exploded view of a portion of another embodiment of a vehicle roof rack system, showing hardware for coupling a support tower to an aerodynamically-shaped crossbar.

This example describes how a coupling assembly of a roof rack system can include interchangeable hardware for coupling the coupler body to differently-shaped crossbars and/or interchangeable hardware for selectively coupling the coupler body to one of a crossbar sleeve and a T-slot underneath a crossbar, see FIGS. 3-5.

FIG. 3 is an exploded isometric view of roof rack system 40 described above, including crossbar 50 which has an aerodynamic shape. An end cap of the crossbar shown in FIG. 2 is omitted in order to show the cross-sectional shape of crossbar 50, in particular a tee shaped slot or T-slot 70 on an underside of the crossbar. Tee slot 70 runs longitudinally along a length of crossbar 50, and comprises a pair of spaced apart lips 72 and 74 defining a gap (i.e. slot 70) therebetween.

Coupling assembly 60 may include a crossbar clamp 76 including a crossbar connector 78 and a crossbar seat 80. Crossbar connector 78 may include any suitable structure configured to capture (e.g., grasp or grip) crossbar 50, and to be movable relative to crossbar seat 80. Crossbar connector 78 may be interchangeably referred to as a crossbar capturing member or crossbar capturing portion of clamp 76.

Crossbar connector 78 includes a flange portion or tee portion 82 and a stem portion 84. Flange portion 82 is a substantially planar plate or flange sized to slide into tee slot 70. Flange portion 82 has a width that spans T-slot 70, such that bottom surfaces of the flange portion may abut upper surfaces of lips 72 and 74. Stem portion 84 extends or protrudes orthogonally from flange portion 82. Stem portion 84 may be sized such that stem portion 84 can extend through slot 70 when flange portion 82 is inserted in the slot. Accordingly, crossbar connector 78 may freely slide in a longitudinal direction along slot 70 of crossbar 50 when clamp 76 is unclamped.

Crossbar seat 80 may include a block having an aperture 86 running vertically through the block, and through which crossbar connector 78 can at least partially extend. For example, stem portion 84 may extend through aperture 86. In some examples, stem portion 84 may be connectible to a clamp actuator 88, such that the actuator can pull crossbar connector 78 downward through aperture 86. For example, stem portion 84 may include a threaded hole for attaching connector 78 to an attachment bolt 90 oriented substantially perpendicular to a long axis 92 of the crossbar. This action may cause flange 82 to exert force on lips 72 and 74, pulling crossbar 50 down onto crossbar seat 80, thereby arresting the downward motion of the crossbar connector and clamping the crossbar in place.

Crossbar clamp 78 may be configured to allow a pitch angle adjustment of the crossbar relative to a coupler body 94 of the coupling assembly 60 around the long axis 92 of the crossbar. Crossbar seat 80 may have a lower mating surface 96 shaped to engage or otherwise fit onto a corresponding support surface 98 of the coupler 60. Lower mating surface 96 may include one or more additional features, such as discrete positioning teeth configured to mate with corresponding teeth or features on the support surface of the coupler. These features may allow the crossbar seat to sit on the coupler at a variety of orientations around the long axis of the crossbar before the crossbar has been clamped, as indicated by curved arrow 100. Once the desired pitch angle has been achieved, the crossbar may then be secured to the coupler by actuating the attachment bolt 90.

FIG. 4 is an exploded isometric view of roof rack system 40 described above, including a round crossbar 110. Coupler 60 may include a clamp 112 including a crossbar connector 114 and a crossbar seat 116. Crossbar connector 114 may include any suitable structure configured to capture (e.g., grasp or grip) crossbar 110, and to be movable relative to crossbar seat 116, such that the captured crossbar can be urged or forced against the crossbar seat. Crossbar connector 114 may be interchangeably referred to as a crossbar capturing member or crossbar capturing portion of clamp 112.

Crossbar seat 116 may include any suitable structure configured to cradle crossbar 110 on a seating surface 118 that generally conforms to an outer surface 120 of the crossbar. Crossbar seat 116 may be described as an anvil or a fixed jaw. In some examples, seating surface 118 may include a resilient, compressible, and/or compliant layer, such as a rubber coating, to reduce damage to crossbar 110.

In this example, crossbar connector 114 includes a sleeve portion 122 and a stem portion 124. Sleeve portion 122 is a substantially cylindrical tube or collar generally conforming to but slightly larger than an outer diameter of the round crossbar. Sleeve portion 122 may freely slide on crossbar 110. Stem portion 124 extends or protrudes radially from an outer surface of sleeve portion 122. Stem portion 124 may include a fastening mechanism, such as a threaded hole, for attaching connector 114 to clamp actuator 88.

Crossbar seat 116 includes a block having an aperture 126 running vertically through the block, and through which crossbar connector 114 can at least partially extend. For example, stem portion 124 may extend through aperture 126. In some examples, stem portion 124 may be connectible to actuator 88, such that the actuator can pull crossbar connector 114 downward through aperture 126. This action causes crossbar 110 to be pulled down onto crossbar seat 116, thereby arresting the downward motion of the crossbar connector and clamping the crossbar in place. In some examples, crossbar 102 may be a steel crossbar and sleeve portion 112 may comprise aluminum.

Crossbar seat 116 is supported on the coupler. Accordingly, a lower mating surface 128 may be shaped to engage or otherwise fit onto a corresponding support surface of the coupler (e.g., support surface 98 described above with respect to FIG. 3). As described above regarding similar crossbar seats, lower mating surface 128 may include one or more additional features, such as discrete positioning teeth, a selected curvature, etc.

FIG. 5 is an exploded isometric view of roof rack system 40 described above, including an aerodynamic (also referred to as "aero") or teardrop shaped crossbar 140, and a clamp 142 of coupling assembly 60. An end cap of crossbar 140 is omitted in order to show the cross-sectional shape of the crossbar. Aero crossbar 140 may or may not include a lower T-slot, similar to crossbar 50. However, crossbars having lower T-slots frequently also have such slots on upper surfaces, and clamp 142 may interfere with these upper slots. Accordingly, it may be desirable to use clamp 76 rather than clamp 142 in some examples, and vice versa.

Clamp 142 includes a crossbar seat 144 and a crossbar connector 146, both of which are similar to their corresponding components in clamp 112. Crossbar seat 144 may include any suitable structure configured to cradle crossbar 140 on a seating surface 148 that generally conforms to an outer surface 150 of the crossbar. Crossbar seat 144 may be described as an anvil or a fixed jaw. In some examples, seating surface 148 may include a resilient, compressible, and/or compliant layer, such as a rubber coating, to reduce damage to crossbar 140.

Crossbar connector 146 may include any suitable structure configured to capture (e.g., grasp or grip) crossbar 140, and to be movable relative to crossbar seat 144, such that the captured crossbar can be urged against seating surface 148. Crossbar connector 146 may be interchangeably referred to as a crossbar capturing member or crossbar capturing portion of clamp 142.

In this example, crossbar connector 146 includes a sleeve portion 152 and a stem portion 154. Sleeve portion 152 is a substantially teardrop-shaped or airfoil-shaped tube or collar generally conforming to but slightly larger than an outer shape of the aero crossbar. Sleeve portion 152 may freely slide on crossbar 140. Stem portion 154 extends or protrudes outward from an outer surface of sleeve portion 152. Stem portion 154 may include a fastening mechanism, such as a threaded hole, for attaching connector 146 to clamp actuator 88.

Crossbar seat 144 includes a block having an aperture 156 running vertically through the block, and through which crossbar connector 146 can at least partially extend. For example, stem portion 154 may extend through aperture 156. In some examples, stem portion 154 may be connectible to actuator 88, such that the actuator can pull crossbar connector 146 downward through aperture 156. This action causes crossbar 140 to be pulled down onto crossbar seat 144, thereby arresting the downward motion of the crossbar connector and clamping the crossbar in place.

Crossbar seat 144 is supported on the coupler 60. Accordingly, a lower mating surface 158 may be shaped to engage or otherwise fit onto a corresponding support surface of the coupler (e.g., support surface 98 described above with respect to FIG. 3). As described above regarding similar crossbar seats, lower mating surface 158 may include one or more additional features, such as discrete positioning teeth, a selected curvature, etc., thereby allowing a pitch angle adjustment of the crossbar 140 relative to the coupler body 160 around a long axis 162 of the crossbar.

Double-Clip Adjustment

Figure 6:
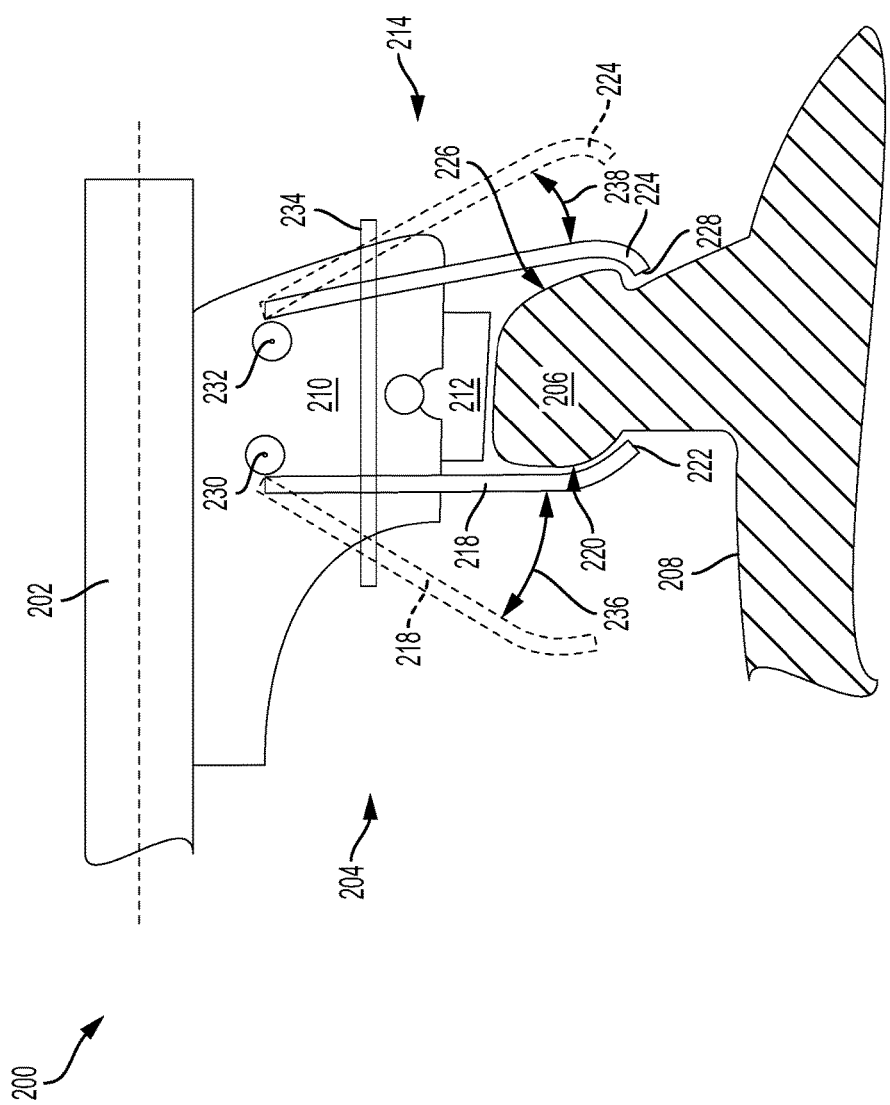
FIG. 6 is a schematic illustration of a vehicle roof rack system, showing an angular rotation of inner and outer clips around inner and outer clip axes.

This example describes an illustrative coupling assembly including a clip retention and adjustment mechanism configured to grip inner and outer sides of a flush roof rail with inner and outer clips by rotating at least one of the inner and outer clips around a clip pivot axis oriented parallel to a direction of vehicle travel, see FIG. 6.

FIG. 6 is a schematic illustration of a vehicle roof rack system, generally indicated at 200. System 200 may include a crossbar 202 and a pair of coupling assemblies, one of which is indicated at 204, configured to mount the crossbar on top of a vehicle. Coupling assembly 204, also referred to as a coupler, is configured to mount the crossbar on top of a flush rail 206 of a vehicle roof 208 such that the long axis of the crossbar is substantially horizontal and perpendicular to a longitudinal axis of the vehicle.

Coupling assembly 204, which may be similar to couplers 16 and/or 60 described above, may include a coupler body 210, a base 212 connected to the coupler body, and a clip retention and adjustment mechanism 214 connected to the coupler body. Base 212 may be configured to sit on or abut the flush rail 206 of the vehicle roof 208. Flush rail 206 may be oriented parallel to the direction of vehicle travel which is directed perpendicular to the plane of FIG. 6. The base 212 may be configured to rotate with respect to the coupler body 210 about a base pivot axis 216 oriented parallel to the flush rail. Rotation of the base may facilitate proper seating of the base on the flush rail or may facilitate proper seating of the base on a differently-configured flush rail of a different vehicle.

Clip retention and adjustment mechanism 214 may be configured to interchangeably receive an inner clip 218 of a set of inner clips. Inner clip 218 may be chosen from the set of inner clips to match a configuration or shape of an inner or inboard side 220 of roof rail 206. That is, the shape of the inner clip proximate a distal end 222 of the inner clip may be configured to complementarily match the shape of the inner side of the roof rail. As roof rails may have a variety of shapes, the clips of the set of inner clips may have a variety of configurations proximate their distal ends.

The clip retention and adjustment mechanism 214 may be configured to interchangeably receive an outer clip 224 of a set of outer clips. Inner clip 224 may be chosen from the set of outer clips to match a configuration or shape of an outer or outboard side 226 of roof rail 206. That is, the shape of the outer clip proximate a distal end 228 of the outer clip may be configured to complementarily match the shape of the outer side of the roof rail. As roof rails may have a variety of shapes, the clips of the set of outer clips may have a variety of configurations proximate their distal ends.

The clip retention and adjustment mechanism 214 may be configured to grip inner side 220 and outer side 226 of the flush rail 206 with inner clip 218 and outer clip 224, respectively, by rotating at least one of the inner and outer clips relative to the coupler body 210 around a clip pivot axis oriented generally parallel to the base picot axis 216. For example, the inner clip may be configured to rotate around an inner clip pivot axis 230. Alternately, or additionally, the outer clip may be configured to rotate around an outer clip pivot axis 232.

Clip retention and adjustment mechanism 214 may include an adjustment member 234. Actuating the adjustment member may rotate one or both of the inner and outer clips around their respective clip pivot axes, thereby either gripping or releasing the roof rail 206. The angular motion of inner clip 218 is indicated by curved arrow 236 between a dashed-line version of clip 218 and a solid-line version of clip 218. The angular motion of outer clip 224 is indicated by curved arrow 238 between a dashed-line version of clip 224 and a solid-line version of clip 224.

Illustrative Coupling Assembly

This example describes an illustrative embodiment of a coupling assembly, generally indicated at 300 in FIGS. 7-14, suitable for use in connecting a rooftop cargo carrying system to a vehicle. The coupling assembly described in this section is an example of coupler 16 described above, and is similar to couplers 60 and 204 described above.

Figure 7:
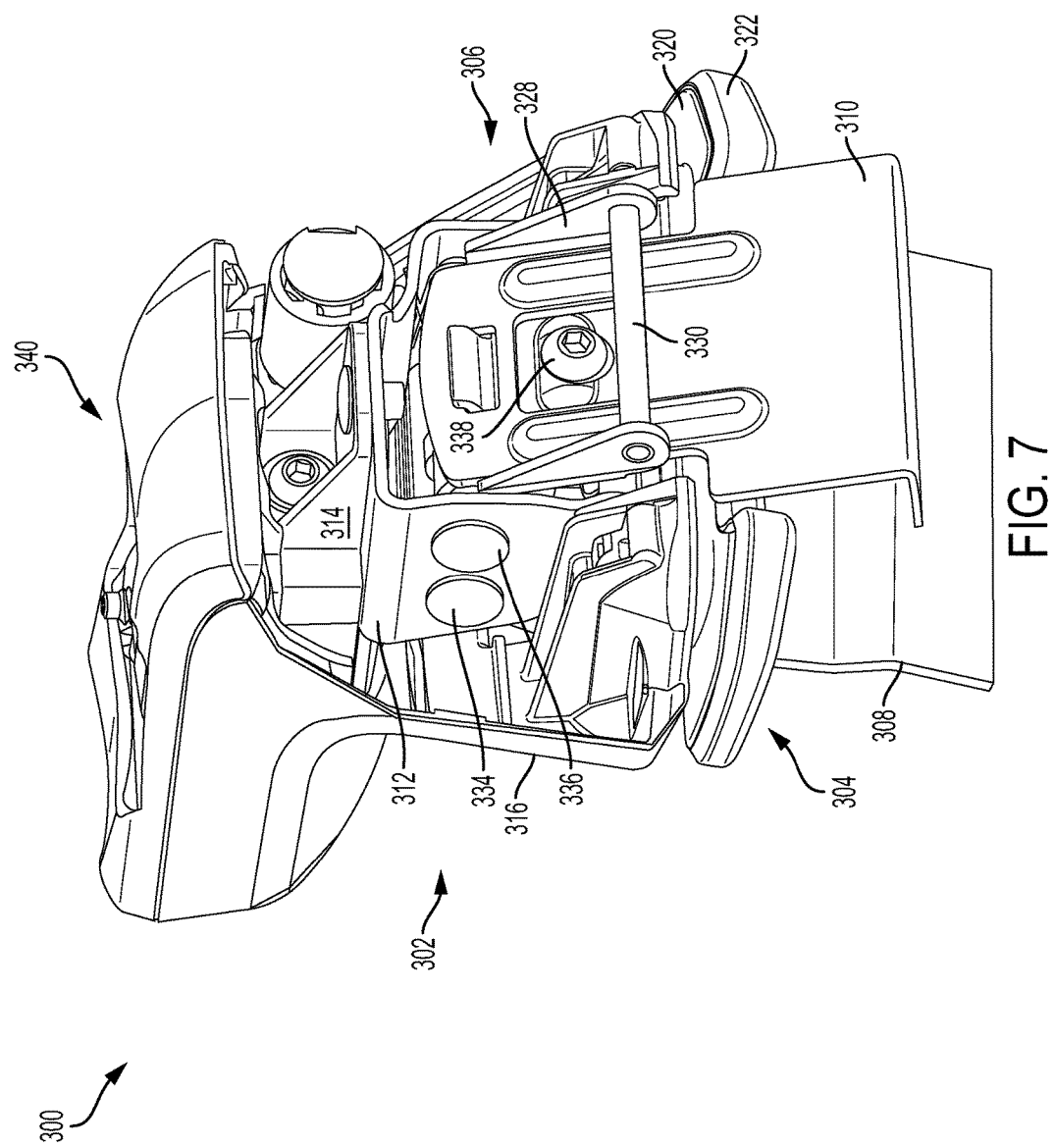
FIG. 7 is a perspective view of an embodiment of a coupling assembly of a vehicle roof rack system with an outer cover removed.
Figure 8:
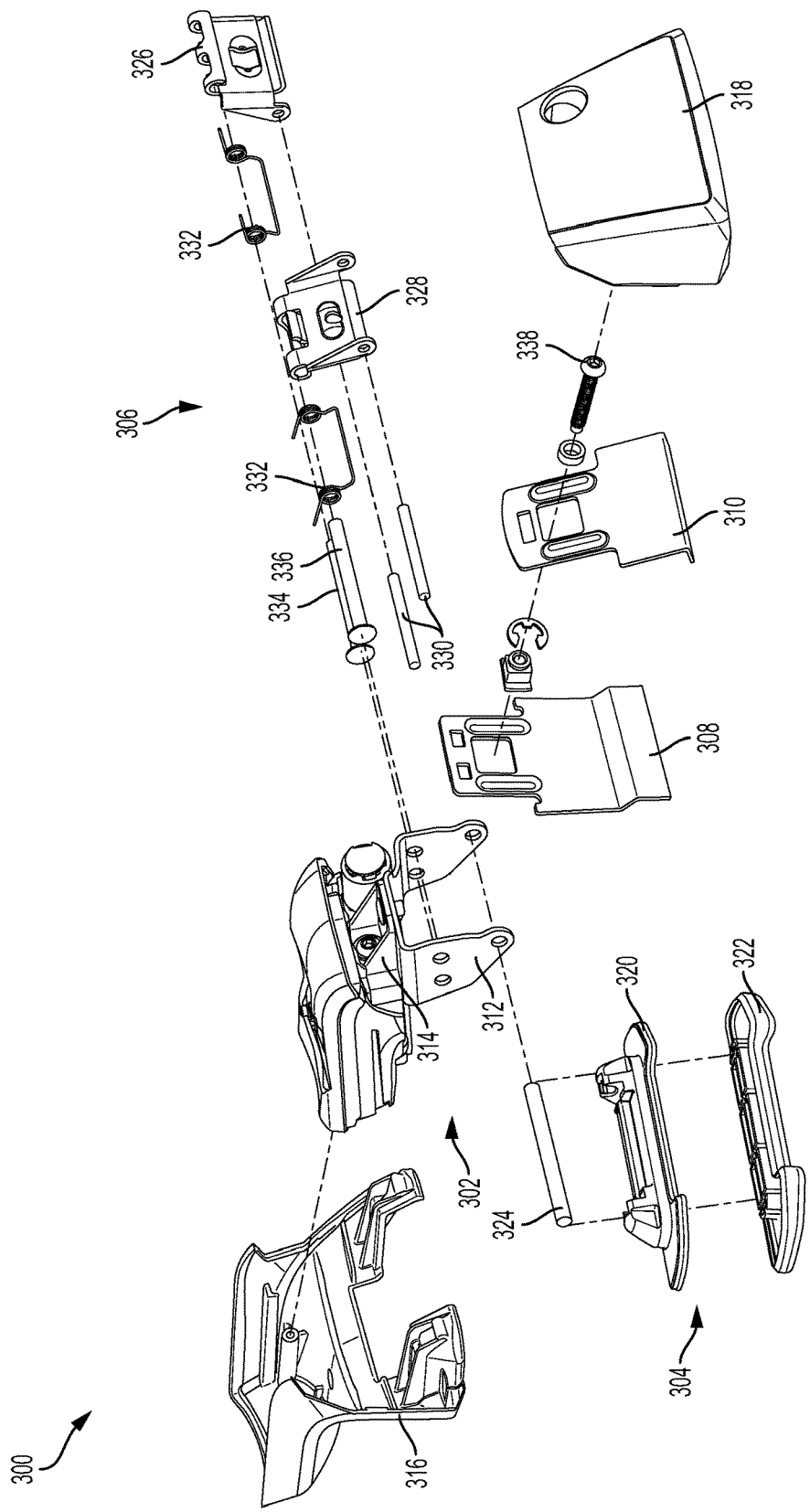
FIG. 8 is an exploded view of the coupling assembly of FIG. 7.

FIG. 7 shows a perspective view of coupling assembly 300 with an outer cover removed. FIG. 8 shows an exploded view of coupling assembly 300. FIGS. 7 and 8 are herein described together. Coupling assembly 300 may include a coupler body 302, a base or base portion 304, a clip retention and adjustment mechanism or assembly 306, an inner clip 308, and an outer clip 310.

Coupler body 302 may include a lower frame 312, an upper frame 314, an inner cover 316, and a removable outer cover 318. Together, the inner and outer covers may protect portions of coupling assembly 300 against dirt, wind, rain, and other elements and may prevent unwanted access to other components of the coupling assembly. The upper and lower frames may provide structural support for the coupling assembly.

Base portion 304 may include a pivoting member 320, a base pad 322, and a base pivot axle 324. Base portion 304 is discussed in more detail in reference to FIGS. 9 and 10.

Clip retention and adjustment mechanism 306 may include an inner carriage 326, an outer carriage 328, one or more crosspieces 330, one or more biasing members 332, an inner clip axle 334, and an outer clip axle 336. The clip retention and adjustment mechanism may further include an adjustment member 338 and a crossbar clamp actuator 340. The clip retention and adjustment mechanism is discussed in more detail in reference to FIGS. 11 and 12.

Figure 9:
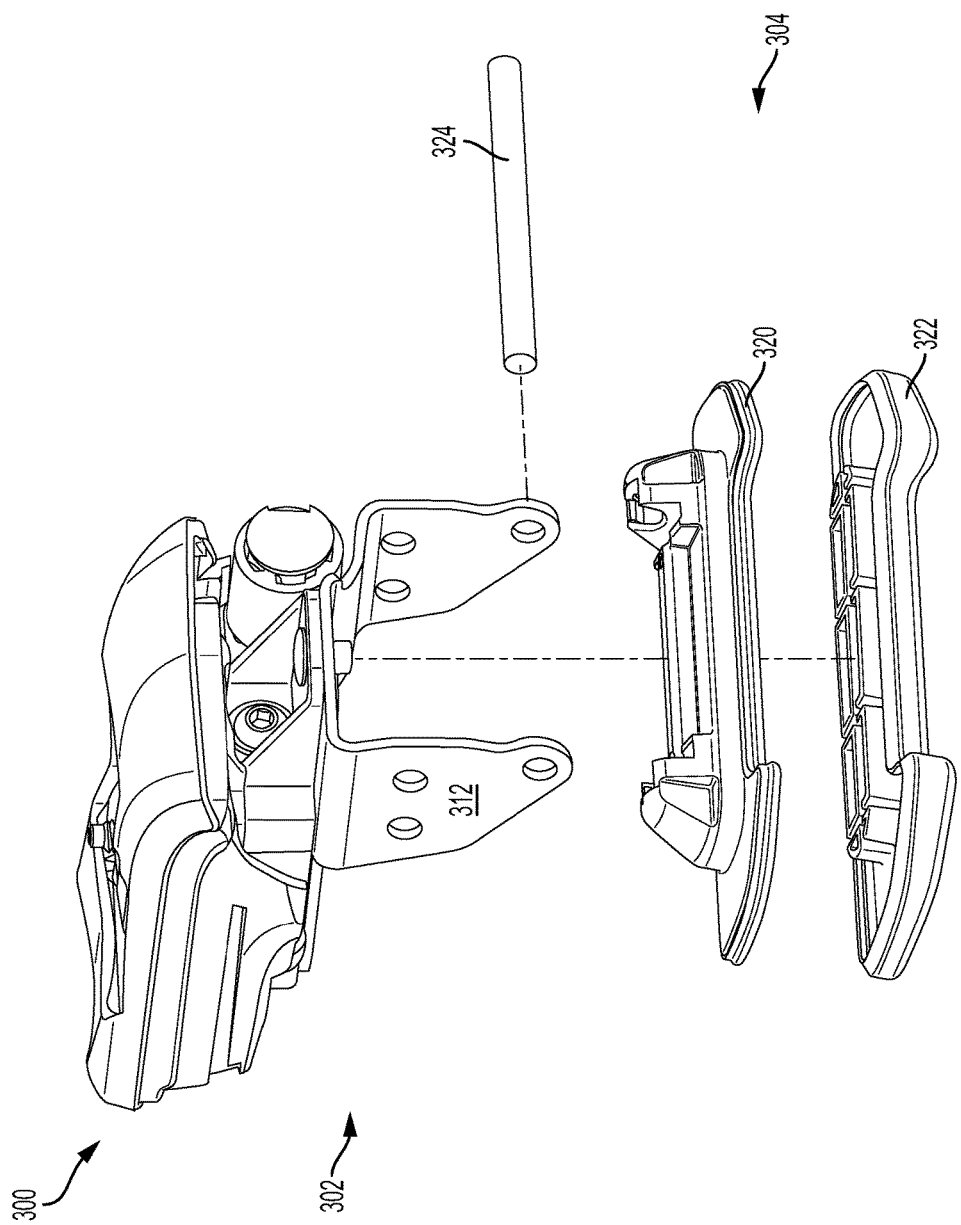
FIG. 9 is an exploded view of the coupling assembly of FIG. 7, showing portions of a base configured to rotate around a base pivot axis.
Figure 10:
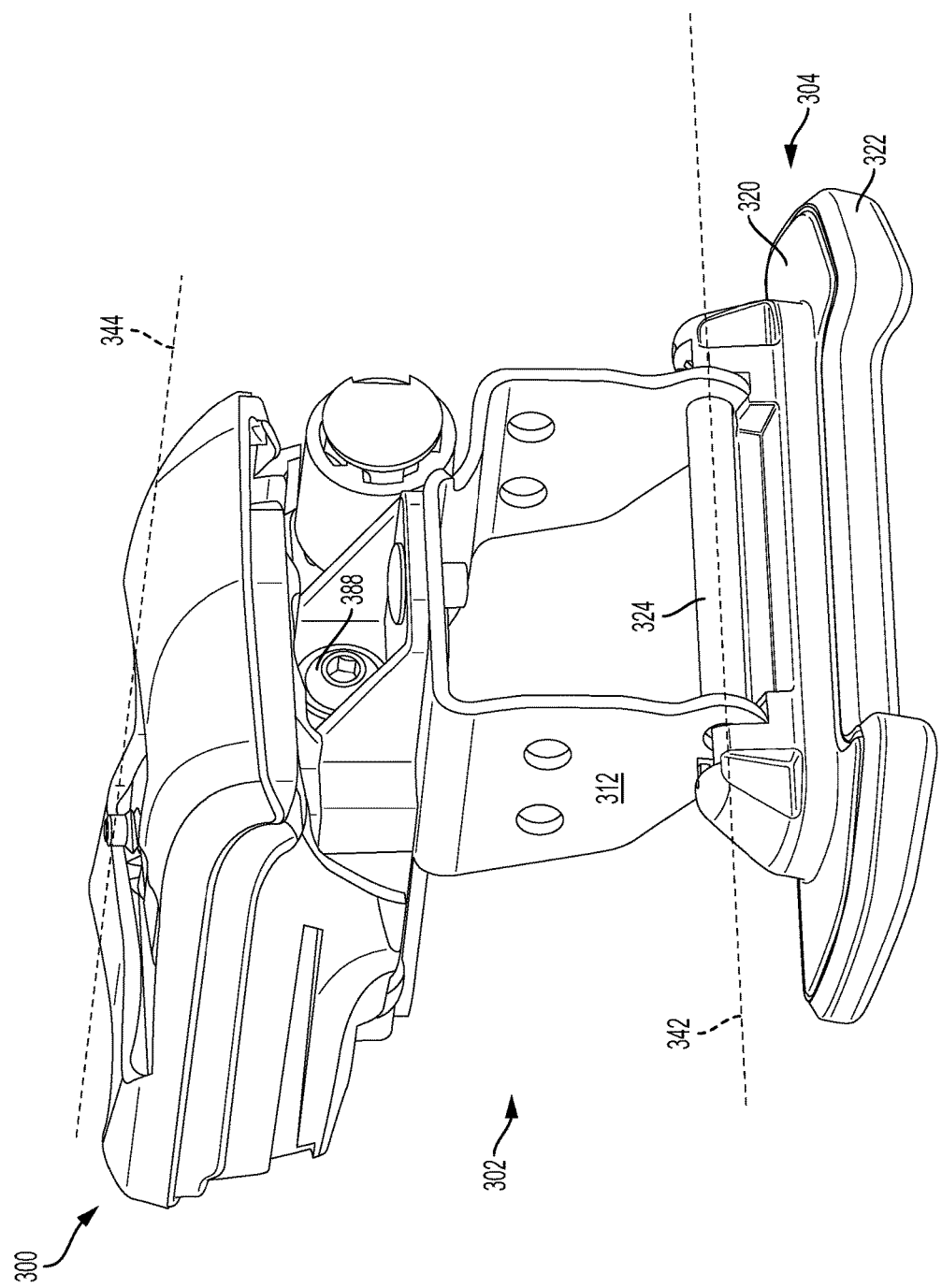
FIG. 10 is a perspective view of a portion of the coupling assembly of FIG. 7, showing portions of a base configured to rotate around a base pivot axis.

FIG. 9 shows an exploded view of the base 304 of coupling assembly 300 along with a portion of the coupler body 302. FIG. 10 shows an unexploded view of the same components. FIGS. 9 and 10 are herein described together.

Portions of base 304 may be configured to rotate with respect to the coupler body 302 about a base pivot axis 342. Base pivot axis 342 may be oriented generally parallel to the flush rail and/or generally parallel to a long axis of the crossbar 344. Pivoting member 320 may be configured to rotate with respect to the coupler body about the base pivot axis. The pivoting member may be releasably coupled to the coupler body 302, perhaps by snapping onto the base pivot axle 324. Alternately, the pivoting member may be pivotally coupled to the coupler body without being releasably coupled to the coupler body. Base pivot axle 324 may be substantially aligned with the base pivot axis 342. Axle 324 may be pivotable with respect to the lower frame 312 of the coupler body or may be fixed relative to the coupler body.

Base pad 322 may be configured to make contact with a roof rail of a vehicle. Base pad 322 may be constructed of a resiliently deformable material, such as rubber, and may prevent damage to the roof. The base pad may be one of an interchangeable set of base pads, with each base pad configured to be coupled to the pivoting member and configured to be used on the roof rail of a particular vehicle or set of vehicles.

Figure 11:
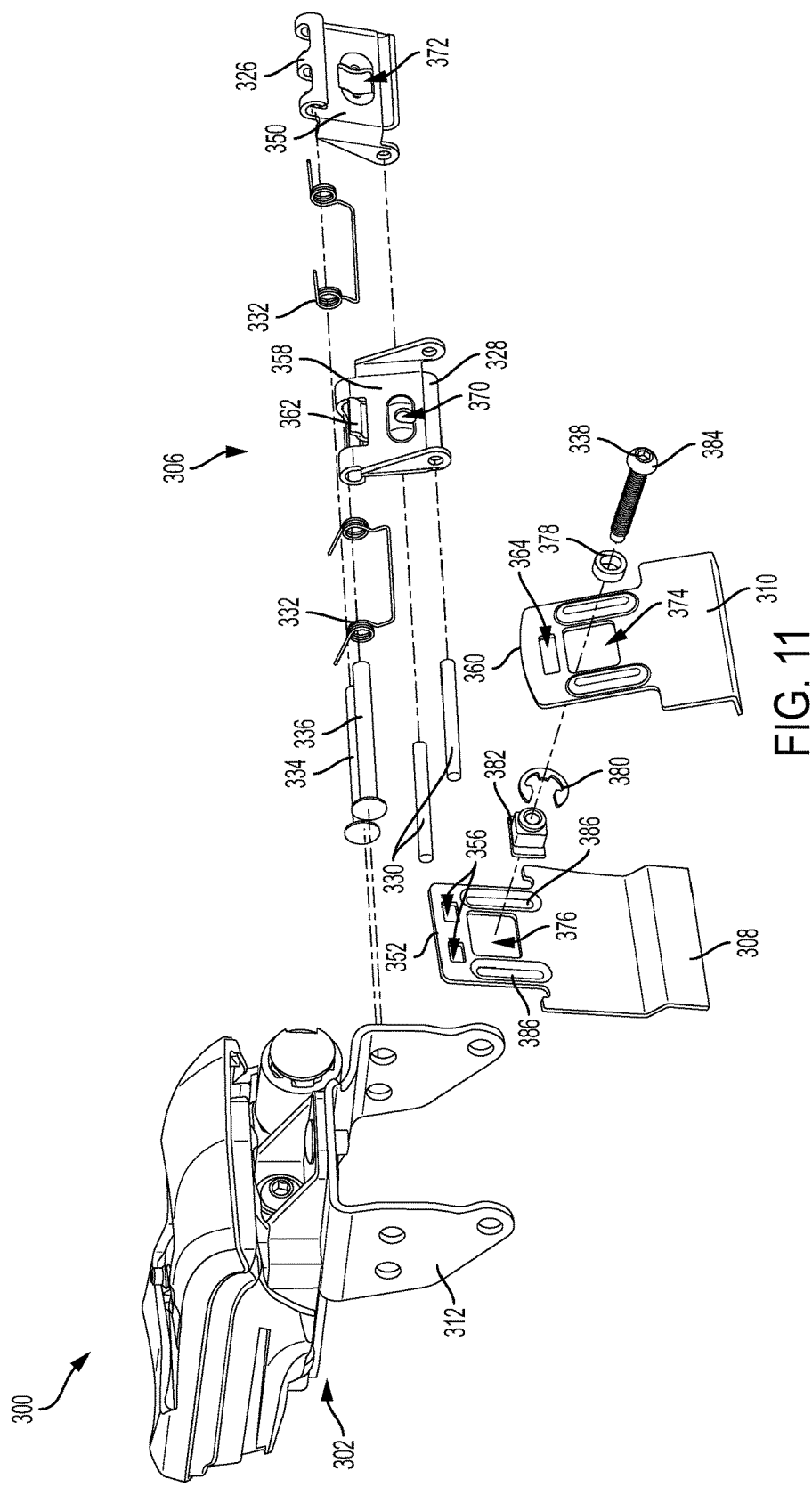
FIG. 11 is an exploded view of the coupling assembly of FIG. 7, showing portions of a clip retention and adjustment mechanism.
Figure 12:
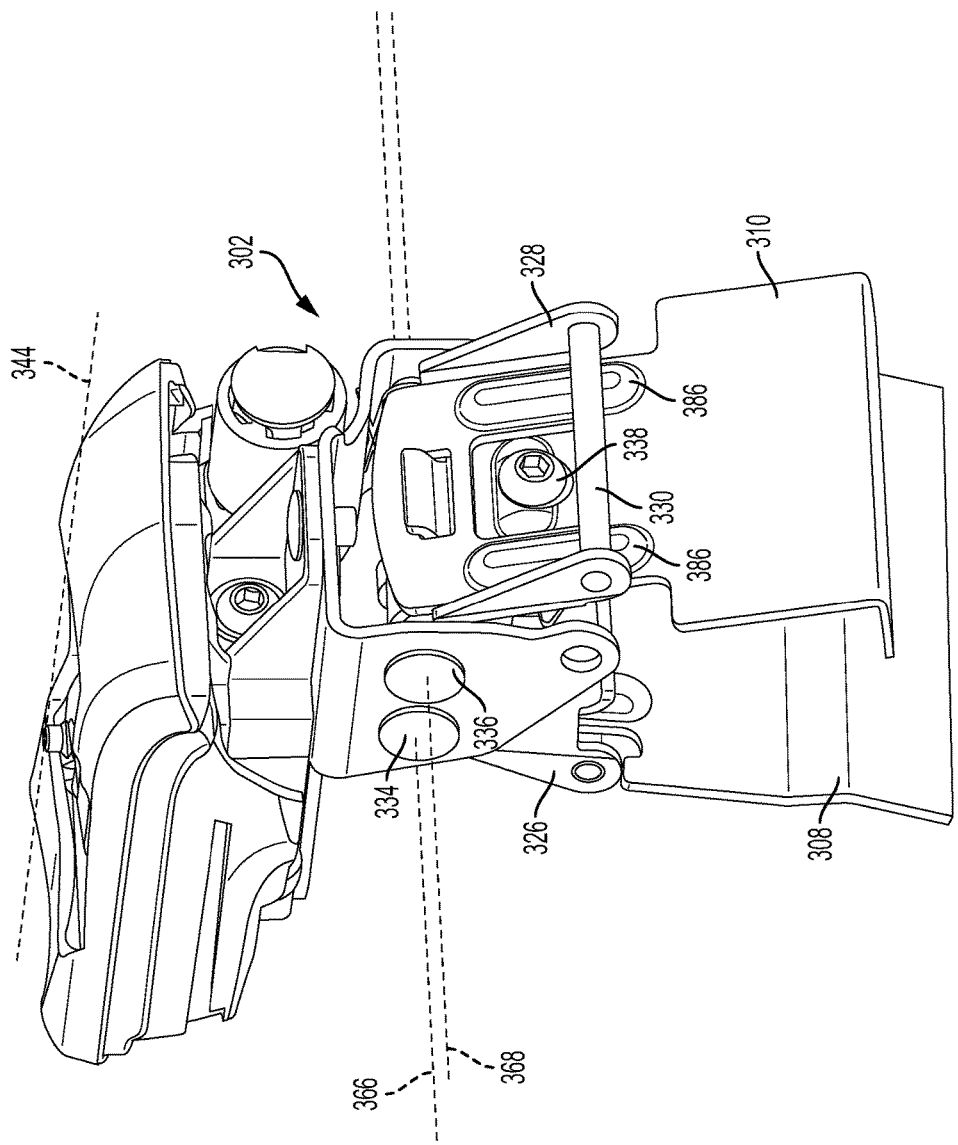
FIG. 12 is a perspective view of the coupling assembly of FIG. 7, showing portions of a clip retention and adjustment mechanism.

FIG. 11 shows an exploded view of the clip retention and adjustment mechanism 306 of coupling assembly 300 and a portion of the coupler body 302 with base 304 omitted. FIG. 12 shows an unexploded view of the same components. FIGS. 11 and 12 are herein described together.

Inner clip 308 may be configured to be releasably coupled to clip retention and adjustment mechanism 306. The inner clip may be interchangeably received by inner carriage 326. Inner carriage 326 may have a back panel 350 and the inner clip may be received by the inner carriage between the back panel and the crosspiece 330 associated with the inner carriage. Crosspiece 330 may facilitate retention of the inner clip by the inner carriage. The inner clip may be received by inserting a proximal end 352 of the inner clip in a generally vertical direction between the crosspiece and the back panel of the inner carriage.

Figure 13:
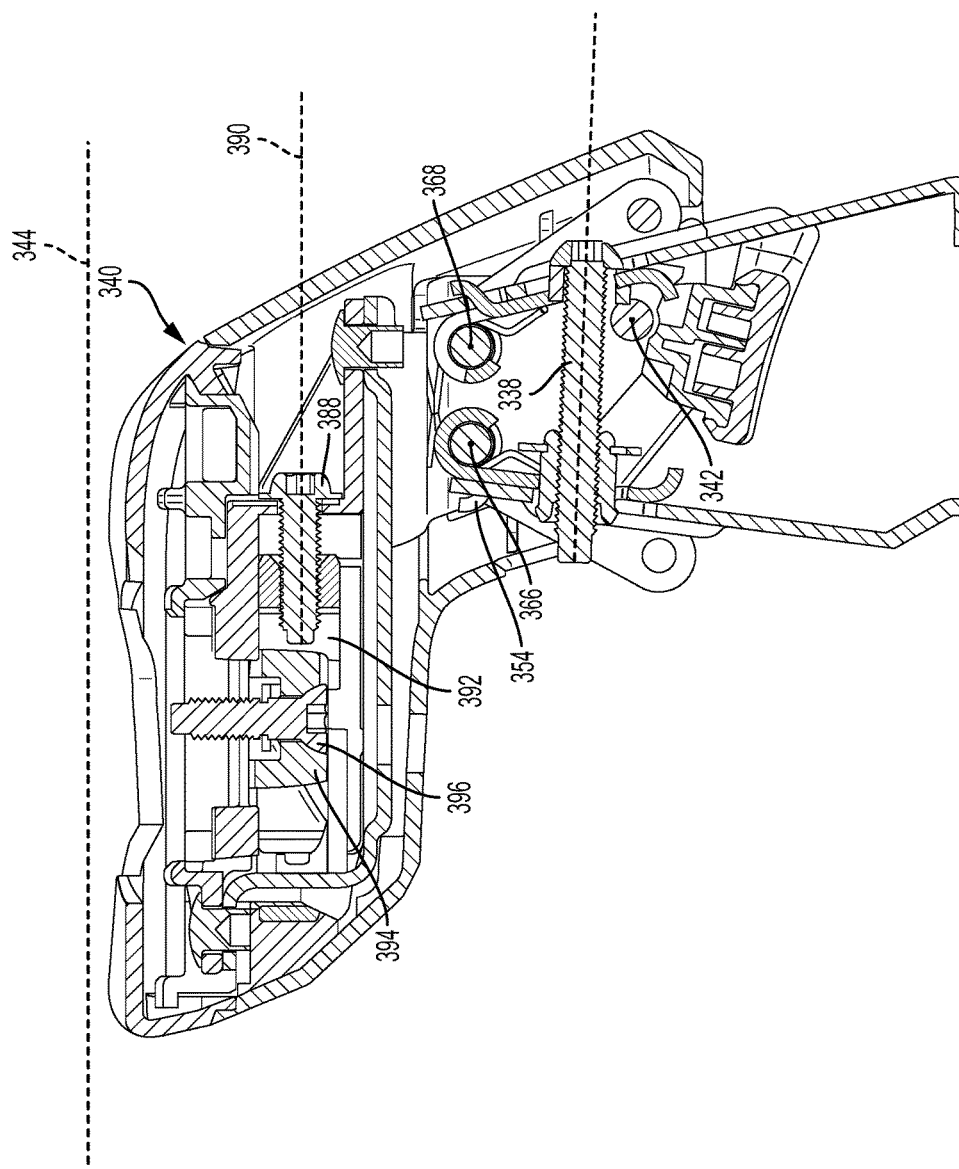
FIG. 13 is a cross-sectional view of the coupling assembly of FIG. 7.

Inner carriage 326 may include at least one hook portion, seen at 354 in FIG. 13, configured to project through at least one aperture 356 in inner clip 308. Hook portion 354 may facilitate retention of the inner clip by the inner carriage. The inner clip may be received by inserting proximal end 352 of the inner clip between the crosspiece and the back panel of the inner carriage and beyond hook portion 354 so that the at least one hook portion engages with the at least one aperture of the inner clip. To properly seat the at least one aperture on the at least one hook portion the clip may move slightly down with respect to the inner carriage after the at least one hook portion has projected through the at least one aperture.

Similarly, outer clip 310 may be configured to be releasably coupled to clip retention and adjustment mechanism 306. The outer clip may be interchangeably received by outer carriage 328. Outer carriage 328 may have a back panel 358 and the outer clip may be received by the inner carriage between the back panel and the crosspiece 330 associated with the outer carriage. Crosspiece 330 may facilitate retention of the outer clip by the outer carriage. The outer clip may be received by inserting a proximal end 360 of the outer clip in a generally vertical direction between the crosspiece and the back panel of the outer carriage.

Outer carriage 328 may include at least one hook portion 362 configured to project through at least one aperture 364 in outer clip 310. Hook portion 362 may facilitate retention of the outer clip by the outer carriage. The outer clip may be received by inserting proximal end 360 of the outer clip between the crosspiece and the back panel of the outer carriage and beyond hook portion 362 so that the at least one hook portion engages with the at least one aperture of the outer clip. To properly seat the at least one aperture on the at least one hook portion the clip may move slightly down with respect to the outer carriage after the at least one hook portion has projected through the at least one aperture.

Inner carriage 326 may be pivotally mounted to the coupler body 302. That is, the inner carriage may be configured to rotate relative to the coupler body around an inner pivot axis 366 generally perpendicular to the long axis 344 of the crossbar. The inner pivot axis 366 may be aligned with the inner clip axle 334. The inner clip axle may be fixed relative to the lower frame 312 or rotatable relative to the lower frame. The inner carriage may be pivotally coupled to the inner clip axle.

Clip retention and adjustment mechanism 306 may include a biasing member 332 associated with inner carriage 326. The biasing member may be configured to urge inner clip 308 away from outer clip 310 toward an open position. The biasing member may be a spring. Rotating the inner clip in order to grip an inner side of a roof rail may include rotating the inner clip against the urging of biasing member 332.

Similarly, outer carriage 328 may be pivotally mounted to the coupler body 302. That is, the outer carriage may be configured to rotate relative to the coupler body around an outer pivot axis 368 generally perpendicular to the long axis 344 of the crossbar. The outer pivot axis 368 may be aligned with the outer clip axle 336. The outer clip axle may be fixed relative to the lower frame 312 or rotatable relative to the lower frame. The outer carriage may be pivotally coupled to the outer clip axle.

Clip retention and adjustment mechanism 306 may include a biasing member 332 associated with outer carriage 328. The biasing member may be configured to urge outer clip 310 away from inner clip 308 toward an open position. The biasing member may be a spring. Rotating the outer clip in order to grip an outer side of a roof rail may include rotating the outer clip against the urging of biasing member 332.

In some embodiments, the inner clip pivot axis and the outer pivot axis may be substantially aligned. That is, there may only be one clip axle instead of two and both the inner and outer clips may be mounted to the one single axle. However, there may be an advantage to having separate, spaced apart axes and axles for the inner and outer clips.

Referring back to FIG. 6, when then inner and outer clips 218 and 224 are in contact with the inner and outer sides 220 and 226, respectively, of roof rail 206, the inner and outer clips are in a nearly parallel and vertical orientation. So aligned, the inner and outer clips will exert substantially horizontal forces on the roof rail. If, instead, the inner clip axis 230 were aligned with the outer clip axis 232, then the inner and outer clips would contact the respective sides of the roof rail at non-vertical angles and exert contact forces having downward components as well as horizontal components. Such forces having downward components may not grip the roof rail as effectively as the horizontal forces.

Returning to the discussion of FIGS. 11 and 12, actuating adjustment member 338 may rotate one or more of the inner and outer carriages 326 and 328 toward a closed position, thereby causing the inner and outer clips 308 and 310 to grip the sides of a flush roof rail. As the inner and outer clips may be coupled to the inner and outer carriages, rotating the inner and outer carriages may include rotating the inner and outer clips. That is, actuating the adjustment member may rotate at least one of the inner and outer clips relative to the coupler body 302 about the clip pivot axis. For example, actuating the adjustment member may rotate the inner clip about inner clip axis 366, may rotate the outer clip about outer clip axis 368, or may rotate both clips about their respective axes.

Adjustment member 338 may be a threaded bolt passing through an aperture 370 in the outer carriage and an aperture 372 in the inner carriage. Adjustment member 338 may further pass through an aperture 374 in the outer clip and an aperture 376 in the inner clip. The threaded bolt 338 may be oriented generally parallel to the long axis 344 of the crossbar. Associated with the adjustment member may be one or more spacers or washers 378, one or more e-clips or fasteners 380, and a nut 382. Nut 382 may engage with inner carriage 326 and a wrench end 384 of the adjustment member may engage with the outer carriage 328 so that turning the threaded bolt causes the inner and outer carriage to rotate toward or away from one another.

Either or both of inner clip 308 and outer clip 310 may include one or more longitudinal ridges 386 extending from a body of the inner and outer clips, respectively. The longitudinal ridges may provide the bodies of the respective clips with more stiffness or resistance to bending than the bodies would have without the ridges. When receiving by the inner and outer carriages 326 and 328, the ridges may make contact with the crossbars 330.

Figure 14:
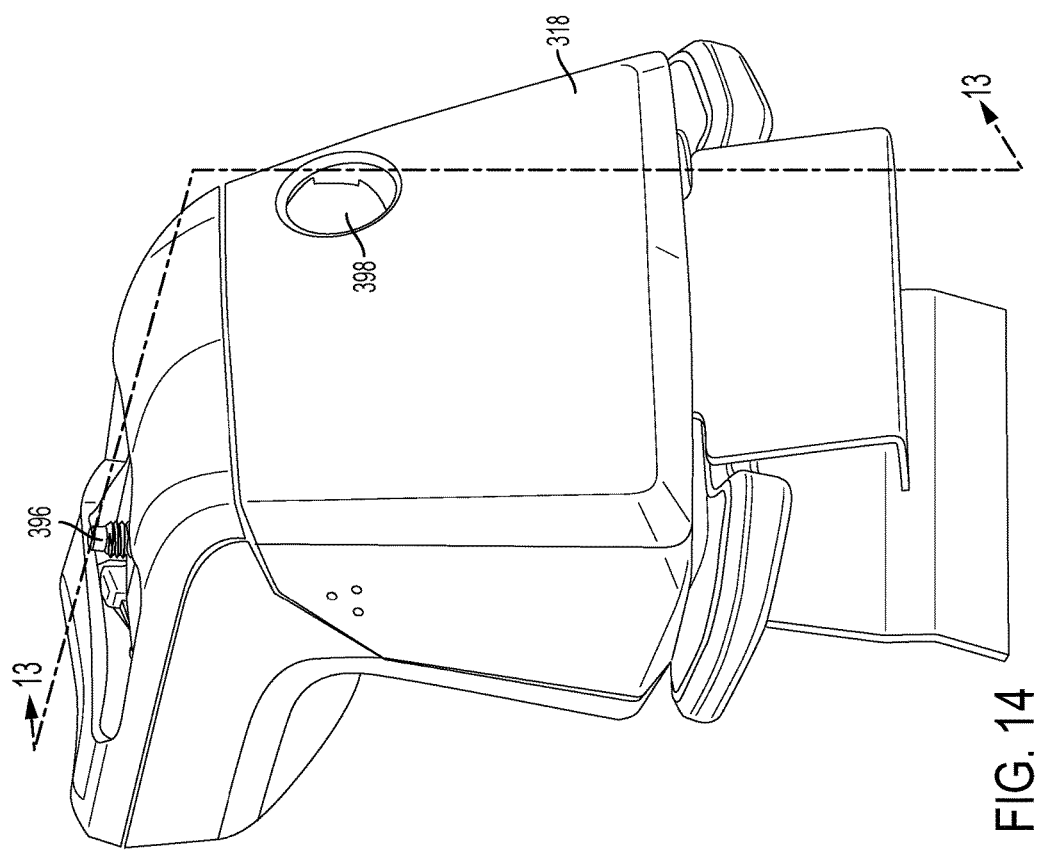
FIG. 14 is a perspective view of the coupling assembly of FIG. 7, showing the outer cover in a secured position.

FIG. 13 shows a cross-sectional view of coupling assembly 300, taken at plane 13-13 in FIG. 14. FIG. 13 shows three axes: the base pivot axis 342, the inner pivot axis 366, and the outer pivot axis 368, any of which may be oriented generally parallel to the longitudinal axis of the vehicle and/or the direction of vehicle travel, see 46 and 48 in FIG. 2. That is, the axes 342, 366, and 368 may be perpendicular to the cross-sectional plane view shown in FIG. 13. Any or all of axes 342, 366, and 368 may be oriented substantially perpendicular to the long axis 344 of the crossbar. Adjustment member 338 may be oriented generally parallel to the long axis of the crossbar, within about five degrees of parallel to the long axis of the crossbar, or within about ten degrees of parallel to the long axis of the crossbar.

Crossbar clamp actuator 340, also referred to as a crossbar clamp, may include a crossbar-securing bolt 388 oriented along an axis 390 generally parallel to the long axis 344 of the crossbar. Crossbar-securing bolt 388, also referred to as a crossbar-tightening screw, may be seen in, for example FIG. 10. Clamp actuator 340 may further include a travelling wedge block 392, a wedge follower 394, and an attachment bolt 396. Attachment bolt 396 may be seen in FIG. 14 and as attachment bolt 90 in FIG. 3. Actuating the crossbar-securing bolt 388 may cause attachment bolt 396 to move downward, thereby securing a crossbar to coupling assembly 300.

Actuating crossbar-securing bolt 388 may include rotating bolt 388 around axis 390. Bolt 388 may engage with a threaded aperture in travelling wedge block 392, thereby causing the wedge block to move in an outboard direction along axis 390. The traveling wedge block 392 may engage with the wedge follower 394, thereby causing the wedge follower to move vertically down. The wedge follower may engage with the attachment bolt 396 and cause the attachment bolt to also move vertically down. Actuating the crossbar-securing bolt in the opposite direction may reverse the above process and release the crossbar from the coupling assembly.

FIG. 14 is a perspective view of coupling assembly 300, showing removable outer cover 318 in a secured position. When outer cover 318 is in the secured position relative to the coupler body, external access to crossbar-securing bolt 390 and/or adjustment member 338 may be prohibited. Preventing access to the crossbar securing bolt may prevent undesired removal of the crossbar and preventing access to the adjustment member may prevent undesired removal of the coupling assembly from the vehicle. Coupling assembly 300 may include a locking mechanism 398. Via the locking mechanism a user may alternately prevent and allow removal of the removable outer cover 318.

Illustrative Method

Figure 15:
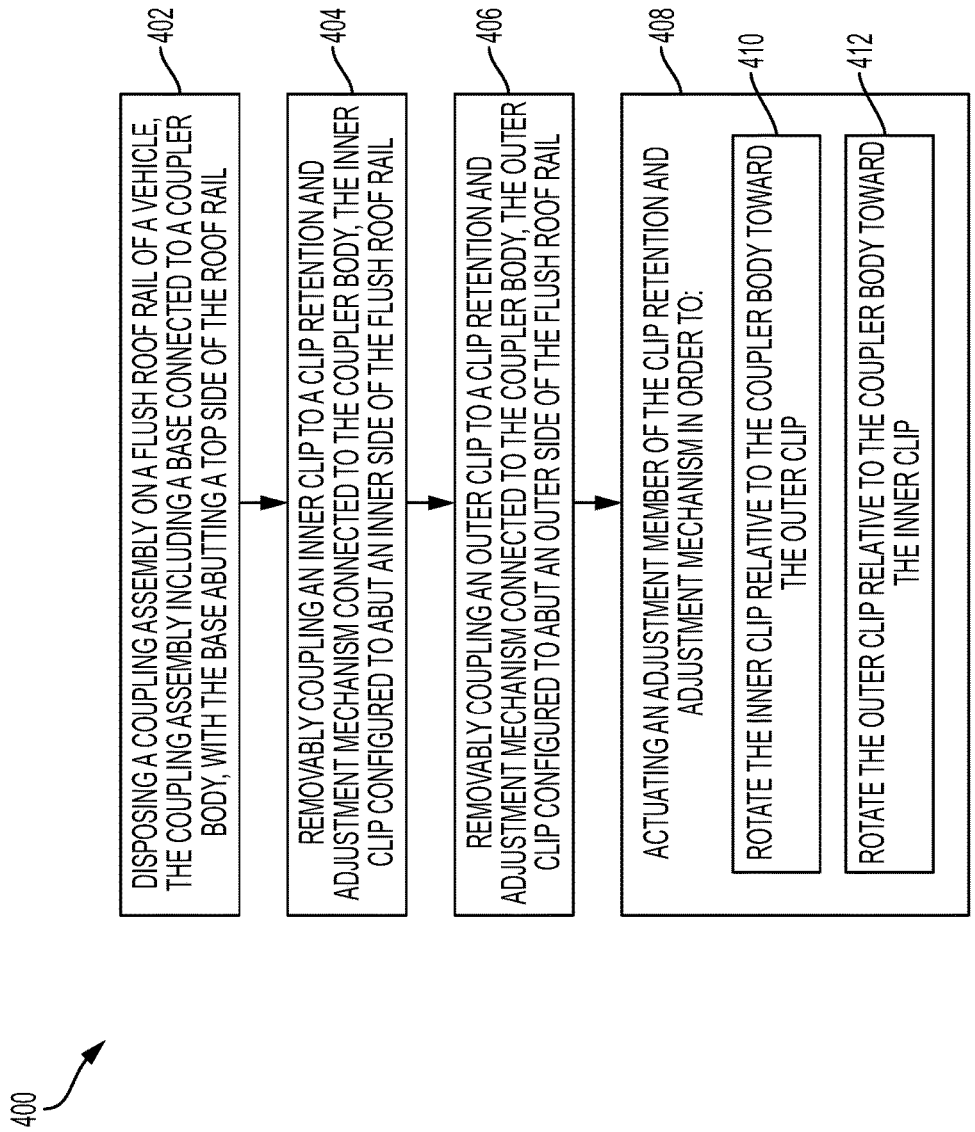
FIG. 15 is a flow chart depicting a method of removably attaching a coupling assembly to a flush roof rail roof of a vehicle, the coupling assembly for use in a rooftop cargo carrying system.

This section describes steps of an illustrative method for removably attaching a coupling assembly to a flush roof rail of a vehicle, the coupling assembly for use in a rooftop cargo carrying system; see FIG. 15. Aspects of crossbars, couplers, and/or actuators described above may be utilized in the method steps described below. Where appropriate, reference may be made to previously described components and systems that may be used in carrying out each step. These references are for illustration, and are not intended to limit the possible ways of carrying out any particular step of the method.

FIG. 15 is a flowchart illustrating steps performed in an illustrative method, and may not recite the complete process or all steps of the method. FIG. 15 depicts multiple steps of a method, generally indicated at 400, which may be performed in conjunction with crossbar-to-vehicle coupling systems and devices according to aspects of the present disclosure. Although various steps of method 400 are described below and depicted in FIG. 15, the steps need not necessarily all be performed, and in some cases may be performed in a different order than the order shown.

Method 400 may include a step of disposing a coupling assembly (e.g. coupler 16, coupling assembly 60, coupling assembly 204, coupling assembly 300) on a flush roof rail of a vehicle. The coupling assembly may include a base connected to a coupler body and the base may abut a top side of the flush roof rail. In some examples, the base may be connected to the coupling assembly. In some examples, method 400 may include removably coupling the base to the coupler body.

Disposing the coupling assembly on the flush roof rail of the vehicle may include adjusting an angle of the base relative to the coupler body. That is, the base may be configured to rotate around a base pivot axis oriented generally parallel to the flush roof rail. Adjusting the angle of the base relative to the coupler body may allow the coupling assembly to sit properly on the roof rail. A coupling assembly including an adjustable base may accommodate many different roof rails having many different configurations.

Prior to disposing the coupling assembly on the flush roof rail, method 400 may include a step of coupling a crossbar to the coupling assembly via a crossbar clamp connected to the coupler body. The crossbar may have a long axis oriented transverse to a direction of vehicle travel and/or a longitudinal axis of the vehicle. Method 400 may further include adjusting the relative disposition of the coupler assembly and the crossbar along the long axis of the crossbar so that the base is aligned with the flush roof rail of the vehicle.

In some examples, the crossbar may be loosely coupled to the coupling assembly until the coupling assembly has been fully secured to the roof rail, at which point the crossbar may be fully secured to the coupling assembly, perhaps by actuating a crossbar-securing bolt or tightening screw (e.g. crossbar-securing bolt 388) oriented generally parallel to the long axis of the crossbar.

In some examples, method 400 may include adjusting a pitch angle of the crossbar relative to the coupler body by rotating the crossbar around the long axis of the crossbar. The pitch angle may be adjusted after the coupling assembly has been secured to the roof rail but before the crossbar has been fully secured and tightened to the coupling assembly.

Method 400 may include a step 404 of removably coupling an inner clip (e.g. one or more clips 34, inner clip 218, inner clip 308) to a clip retention and adjustment mechanism (e.g. retention and adjustment mechanisms 36, 214, 306) connected to the coupler body. The inner clip may be configured to abut an inner side of the flush roof rail. The inner clip may be one of a set of inner clips and may be chosen so that a shape of the inner clip is complementary to a shape of the inner side of the flush roof rail.

Removably coupling the inner clip to the clip retention and adjustment mechanism may include inserting the inner clip into an inner carriage of the clip retention and adjustment mechanism. The inner carriage may be pivotally mounted to the coupler body. In order to insert the inner clip into the inner carriage, the coupler body may be lifted relative to the flush roof rail and replaced on the rail once the clip has been inserted.

Removably coupling the inner clip to the clip retention and adjustment mechanism may include disposing a hook portion of the inner carriage in an aperture of the inner clip. That is, the inner clip may be inserted into the inner carriage until the hook portion of the inner carriage engages with an aperture in the inner clip. This engagement may prevent untimely removal of the inner clip.

Method 400 may include a step 406 of removably coupling an outer clip (e.g. one or more clips 34, outer clip 218, outer clip 308) to a clip retention and adjustment mechanism (e.g. retention and adjustment mechanisms 36, 214, 306) connected to the coupler body. The outer clip may be configured to abut an outer side of the flush roof rail. The outer clip may be one of a set of outer clips and may be chosen so that a shape of the outer clip is complementary to a shape of the outer side of the flush roof rail.

Removably coupling the outer clip to the clip retention and adjustment mechanism may include inserting the outer clip into an outer carriage of the clip retention and adjustment mechanism. The outer carriage may be pivotally mounted to the coupler body. In order to insert the outer clip into the outer carriage, the coupler body may be lifted relative to the flush roof rail and replaced on the rail once the clip has been inserted.

Removably coupling the outer clip to the clip retention and adjustment mechanism may include disposing a hook portion of the outer carriage in an aperture of the outer clip. That is, the outer clip may be inserted into the outer carriage until the hook portion of the outer carriage engages with an aperture in the outer clip. This engagement may prevent untimely removal of the outer clip.

Method 400 may include a step 408 of actuating an adjustment member of the clip retention and adjustment mechanism. In some examples, the adjustment member may be a threaded bolt or screw and actuating the adjustment member may include turning the bolt or screw.

Step 408 may include a substep 410 of rotating the inner clip relative to the coupler body toward the outer clip. The inner clip may be rotated in order to grip the inner side of the flush rail. Step 408 may include a substep 412 of rotating the outer clip relative to the coupler body toward the inner clip. The outer clip may be rotated in order to grip the outer side of the flush rail. In some examples, only the inner rail may rotate. In some examples, only the outer rail may rotate. In some examples, both the inner rail and the outer rail may rotate.

Method 400 may optionally include disposing a removable outer cover over the clip retention and adjustment mechanism, thereby preventing access to the adjustment member. Disposing the removable outer cover over the clip retention and adjustment mechanism may further prevent access to the crossbar-securing bolt. In some examples, method 400 may include locking the removable outer cover in a secured position relative to the coupler body.

Selected Aspects and Examples

This section describes additional aspects and features of vehicle roof racks, coupling assemblies, and related systems and methods, presented without limitation as a series of paragraphs, some or all of which may be alphanumerically designated for clarity and efficiency. Each of these paragraphs can be combined with one or more other paragraphs, and/or with disclosure from elsewhere in this application, including the materials incorporated by reference in the Cross-References, in any suitable manner. Some of the paragraphs below expressly refer to and further limit other paragraphs, providing without limitation examples of some of the suitable combinations.

A1. A coupling assembly for connecting a rooftop cargo carrying system to a vehicle, the coupling assembly comprising:

a coupler body including a crossbar clamp configured to be coupled to a crossbar, the crossbar oriented transverse to a direction of vehicle travel;

a base connected to the coupler body, the base configured to sit on a flush rail of a vehicle roof, the flush rail oriented generally parallel to the direction of vehicle travel; and a clip retention and adjustment mechanism connected to the coupler body, the clip retention and adjustment mechanism having an adjustment member;

wherein the clip retention and adjustment mechanism is configured to interchangeably receive an inner clip and interchangeably receive an outer clip; and wherein the clip retention and adjustment mechanism is configured to rotate the received inner and outer clips with respect to the coupler body in order to grip inner and outer sides, respectively, of the flush rail by actuating the adjustment member.

A2. The coupling assembly of paragraph A1, wherein the crossbar clamp includes interchangeable hardware for coupling the coupler body to differently-shaped crossbars.

A3. The coupling assembly of paragraph A1, wherein the crossbar clamp includes interchangeable hardware for selectively coupling to one of a crossbar sleeve and a T-slot underneath a crossbar.

A4. The coupling assembly of paragraph A1, wherein the crossbar clamp includes a crossbar-securing bolt oriented generally parallel to a long axis of the crossbar.

A5. The coupling assembly of paragraph A1, wherein the base is configured to rotate with respect to the coupler body about a base pivot axis oriented generally parallel to the flush rail.

A6. The coupling assembly of paragraph A1, wherein the clip retention and adjustment mechanism includes an inner carriage and an outer carriage, the inner carriage configured to be releasably coupled to the inner clip and the outer carriage configured to be releasably coupled to the outer clip.

A7. The coupling assembly of paragraph A6, wherein the inner carriage is configured to rotate relative to the coupler body around an inner clip axis generally perpendicular to a long axis of the crossbar and the outer carriage is configured to rotate relative to the coupler body around an outer clip axis generally perpendicular to the long axis of the crossbar.

A8. The coupling assembly of paragraph A7, wherein the inner carriage includes a crosspiece configured to facilitate retention of the inner clip to the inner carriage and the outer carriages includes a crosspiece configured to facilitate retention of the outer clip to the outer carriage.

A9. The coupling assembly of paragraph A8, wherein (a) the inner carriage includes at least one hook portion configured to project through an aperture in the inner clip and facilitate retention of the inner clip to the inner carriage and (b) the outer carriage includes at least one hook portion configured to project through an aperture in the outer clip and facilitate retention of the outer clip to the outer carriage.

A10. The coupling assembly of A9, wherein the clip retention and adjustment mechanism includes at least one biasing member configured to urge the inner and outer clips away from one another toward an open position.

A11. The coupling assembly of paragraph A6, wherein the adjustment member is a threaded bolt passing through apertures in the outer and inner carriages and oriented generally parallel to a long axis of the crossbar.

A12. The coupling assembly of paragraph A1, further comprising a removable outer cover configured to prevent external access to the adjustment member when the outer cover is in a secured position relative to the coupler body.

A13. The coupling assembly of paragraph A1, wherein the crossbar clamp is configured to allow a pitch angle adjustment of the crossbar relative to the coupler body around a long axis of the crossbar.

A14. The coupling assembly of paragraph A1, wherein the inner clip is one of a set of inner clips and the outer clip is one of a set of outer clips.

B1. A rack for carrying cargo on top of a vehicle, the rack comprising:
a crossbar and a pair of coupling assemblies configured to mount the crossbar on top of a vehicle such that a long axis of the crossbar is substantially horizontal and generally perpendicular to a longitudinal axis of the vehicle;
wherein each coupling assembly includes:
a coupler body including a crossbar clamp configured to be coupled to a crossbar, the crossbar oriented transverse to the longitudinal axis of the vehicle;
a base connected to the coupler body, the base configured to sit on a flush rail of a vehicle roof, the flush rail oriented generally parallel to the longitudinal axis of the vehicle, the base configured to rotate with respect to the coupler body about a base pivot axis oriented generally parallel to the flush rail;
a clip retention and adjustment mechanism connected to the coupler body, the clip retention and adjustment mechanism configured to grip inner and outer sides of a flush rail with inner and outer clips, respectively, by rotating at least one of the inner and outer clips relative to the coupler body around a clip pivot axis oriented generally parallel to the base pivot axis.

B2. The rack of paragraph B1, wherein the crossbar clamp includes interchangeable hardware for coupling the coupler body to differently-shaped crossbars.

B3. The rack of paragraph B1, wherein the crossbar clamp includes interchangeable hardware for selectively coupling to one of a crossbar sleeve and a T-slot underneath a crossbar.

B4. The rack of paragraph B1, wherein the crossbar clamp includes a crossbar-securing bolt oriented generally parallel to a long axis of the crossbar.

B5. The rack of paragraph B1, wherein (a) the inner clip is one of a set of inner clips and the inner clip is configured to be releasably coupled to the clip retention and adjustment mechanism and (b) the outer clip is one of a set of outer clips and the outer clip is configured to be releasably coupled to the clip retention and adjustment mechanism.

B6. The rack of paragraph B5, wherein the inner clip is configured to be interchangeably received by an inner carriage pivotally mounted to the coupler body and the outer clip is configured to be interchangeably received by an outer carriage pivotally mounted to the coupler body.

B7. The rack of paragraph B6, wherein the inner carriage is configured to rotate relative to the coupler body around an inner pivot axis generally perpendicular to a long axis of the crossbar and the outer carriage is configured to rotate relative to the coupler body around an outer pivot axis generally perpendicular to the long axis of the crossbar.

B8. The rack of paragraph B7, wherein the inner carriage includes a crosspiece configured to facilitate retention of the inner clip by the inner carriage and the outer carriage includes a crosspiece configured to facilitate retention of the outer clip by the outer carriage.

B9. The rack of paragraph B8, wherein (a) the inner carriage includes at least one hook portion configured to project through an aperture in the inner clip and facilitate retention of the inner clip by the inner carriage and (b) the outer carriage includes at least one hook portion configured to project through an aperture in the outer clip and facilitate retention of the outer clip by the outer carriage.

B10. The rack of B9, wherein the clip retention and adjustment mechanism includes at least one biasing member configured to urge the inner and outer clips away from one another toward an open position.

B11. The rack of paragraph B1, wherein the clip retention and adjustment member includes an adjustment member and wherein actuating the adjustment member rotates at least one of the inner and outer clips relative to the coupler body about the clip pivot axis oriented generally parallel to the base pivot axis.

B12. The rack of paragraph B11, wherein the adjustment member is a threaded bolt passing through apertures in the outer and inner carriages and oriented generally parallel to a long axis of the crossbar.

B13. The rack of paragraph B1, wherein the coupling assembly further includes a removable outer cover configured to prevent external access to the clip retention and adjustment mechanism when the outer cover is in a secured position relative to the coupler body.

B14. The rack of paragraph B1, wherein the crossbar clamp is configured to allow a pitch angle adjustment of the crossbar relative to the coupler body around a long axis of the crossbar.

C1. A method of removably attaching a coupling assembly to a flush roof rail of a vehicle, the coupling assembly for use in a rooftop cargo carrying system, the method comprising:

disposing the coupling assembly on the flush roof rail of the vehicle, the coupling assembly including a base connected to a coupler body, with the base abutting a top side of the flush roof rail;

removably coupling an inner clip of a set of inner clips to a clip retention and adjustment mechanism connected to the coupler body, the inner clip configured to abut an inner side of the flush roof rail;

removably coupling an outer clip of a set of outer clips to the clip retention and adjustment mechanism, the outer clip configured to abut an outer side of the flush roof rail; and actuating an adjustment member of the clip retention and adjustment mechanism;

wherein actuating the adjustment member includes:
rotating the inner clip relative to the coupler body and toward the outer clip in order to grip the inner side of the flush rail and
rotating the outer clip relative to the coupler body and toward the inner clip in order to grip the outer side of the flush rail.

C2. The method of paragraph C1, further comprising coupling a crossbar to the coupling assembly via a crossbar clamp connected to the coupler body, the crossbar having a long axis oriented transverse to a direction of vehicle travel.

C3. The method of paragraph C2, further comprising adjusting the relative disposition of the coupler assembly and the crossbar along the long axis of the crossbar so that the base is aligned with the flush roof rail of the vehicle.

C4. The method of paragraph C2, wherein coupling the crossbar to the coupling assembly includes actuating a crossbar-securing bolt oriented generally parallel to the long axis of the crossbar.

C5. The method of paragraph C2, further comprising adjusting a pitch angle of the crossbar relative to the coupler body by rotating the crossbar around the long axis of the crossbar.

C6. The method of paragraph C1, further comprising removably coupling the base to the coupler body.

C7. The method of paragraph C1, wherein disposing the coupling assembly on the flush roof rail of the vehicle includes adjusting an angle of the base relative to the coupler body, the base configured to rotate around a base pivot axis oriented generally parallel to the flush roof rail.

C8. The method of paragraph C1, wherein removably coupling the inner clip to the clip retention and adjustment mechanism includes lifting the coupler body relative to the flush roof rail.

C9. The method of paragraph C1, wherein removably coupling the outer clip to the clip retention and adjustment mechanism includes lifting the coupler body relative to the flush roof rail.

C10. The method of paragraph C1, wherein removably coupling the inner clip to the clip retention and adjustment mechanism includes inserting the inner clip into an inner carriage of the clip retention and adjustment mechanism, the inner carriage pivotally mounted to the coupler body, and wherein removably coupling the outer clip to the clip retention and adjustment mechanism includes inserting the outer clip into an outer carriage of the clip retention and adjustment mechanism, the outer carriage pivotally mounted to the coupler body.

C11. The method of paragraph C10, wherein removably coupling the inner clip to the clip retention and adjustment mechanism includes disposing a hook portion of the inner carriage in an aperture of the inner clip and coupling the outer clip to the clip retention and adjustment mechanism includes disposing a hook portion of the outer carriage in an aperture of the outer clip.

C12. The method of paragraph C1, further comprising disposing a removable outer cover over the clip retention and adjustment mechanism, thereby preventing access to the adjustment member.

C13. The method of paragraph C12, further comprising locking the removable outer cover in a secured position relative to the coupler body.

Advantages, Features, Benefits

The different embodiments of the coupling assembly and related systems and methods described herein provide several advantages over known solutions for mounting crossbars on vehicles. For example, illustrative embodiments and examples described herein allow a pair of clips to grip opposite sides of a flush roof rail of a vehicle by rotating about independent rotation axes oriented parallel to a longitudinal axis of the vehicle. Additionally, and among other benefits, illustrative embodiments and examples described herein allow a base of the coupling assembly to rotate relative to the rest of the coupling assembly in order for the coupling assembly to seat properly on the flush roof rail. Additionally, and among other benefits, illustrative embodiments and examples described herein allow the pair of clips to be chosen from sets of clips to accommodate a specific flush rail of a vehicle roof, thereby facilitating the attaching of the coupling assembly to a variety of vehicle roofs.

Additionally, and among other benefits, illustrative embodiments and examples described herein facilitate the use of interchangeable crossbar clamps on the same coupler.

No other known system or device can perform all of these functions. However, not all embodiments and examples described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A coupling assembly for connecting a rooftop cargo carrying system to a vehicle, the coupling assembly comprising:
   a coupler body including a crossbar clamp configured to be coupled to a crossbar, the crossbar oriented transverse to a direction of vehicle travel;
   a base connected to the coupler body, the base configured to sit on a flush rail of a vehicle roof, the flush rail oriented generally parallel to the direction of vehicle travel; and
   a clip retention and adjustment mechanism connected to the coupler body, the clip retention and adjustment mechanism having an adjustment member;
   wherein the clip retention and adjustment mechanism interchangeably receives an inner clip and interchangeably receives an outer clip; and
   wherein the clip retention and adjustment mechanism is configured to rotate the inner and outer clips with respect to the coupler body in order to grip inner and outer sides, respectively, of the flush rail by actuating the adjustment member;
   the clip retention and adjustment mechanism including an inner carriage and an outer carriage, the inner carriage configured to be releasably coupled to the inner clip and the outer carriage configured to be releasably coupled to the outer clip; and
   wherein the inner carriage is configured to rotate relative to the coupler body around an inner clip axis generally perpendicular to a long axis of the crossbar and the outer carriage is configured to rotate relative to the coupler body around an outer clip axis generally perpendicular to the long axis of the crossbar.

2. The coupling assembly of claim 1, wherein the base is configured to rotate with respect to the coupler body about a base pivot axis oriented generally parallel to the flush rail.

3. The coupling assembly of claim 1, wherein the adjustment member is a threaded bolt passing through apertures in the outer and inner carriages and oriented generally parallel to a long axis of the crossbar.

4. The coupling assembly of claim 1, wherein the inner carriage includes a crosspiece configured to facilitate retention of the inner clip to the inner carriage and the outer carriages includes a crosspiece configured to facilitate retention of the outer clip to the outer carriage.

5. The coupling assembly of claim 4, wherein (a) the inner carriage includes at least one hook portion configured to project through an aperture in the inner clip and facilitate retention of the inner clip to the inner carriage and (b) the outer carriage includes at least one hook portion configured to project through an aperture in the outer clip and facilitate retention of the outer clip to the outer carriage.

6. The coupling assembly of 5, wherein the clip retention and adjustment mechanism includes at least one biasing member configured to urge the inner and outer clips away from one another toward an open position.

7. A rack system for carrying cargo on top of a vehicle, the rack comprising:
   a crossbar and a pair of coupling assemblies configured to mount the crossbar on top of a vehicle such that a long axis of the crossbar is substantially horizontal and generally perpendicular to a longitudinal axis of the vehicle;
   wherein each coupling assembly includes:
      a coupler body including a crossbar clamp configured to be coupled to a crossbar, the crossbar oriented transverse to the longitudinal axis of the vehicle;
      a base connected to the coupler body, the base configured to sit on a flush rail of a vehicle roof, the flush rail oriented generally parallel to the longitudinal axis of the vehicle, the base configured to rotate with respect to the coupler body about a base pivot axis oriented generally parallel to the flush rail;
      a clip retention and adjustment mechanism connected to the coupler body, the clip retention and adjustment mechanism configured to grip inner and outer sides of a flush rail with inner and outer clips, respectively, by rotating at least one of the inner and outer clips relative to the coupler body around a clip pivot axis oriented generally parallel to the base pivot axis; and
      wherein the crossbar clamp includes interchangeable hardware for coupling the coupler body to differently-shaped crossbars.

8. The rack system of claim 7, wherein the crossbar clamp includes interchangeable hardware for selectively coupling to one of a crossbar sleeve and a T-slot underneath a crossbar.

9. The rack system of claim 7, wherein the crossbar clamp includes a crossbar-securing bolt oriented generally parallel to a long axis of the crossbar.

10. The rack system of claim 7, wherein the coupling assembly further includes a removable outer cover configured to prevent external access to the clip retention and adjustment mechanism when the outer cover is in a secured position relative to the coupler body.

11. The rack system of claim 7, wherein (a) the inner clip is one of a set of inner clips and the inner clip is configured to be releasably coupled to the clip retention and adjustment mechanism and (b) the outer clip is one of a set of outer clips and the outer clip is configured to be releasably coupled to the clip retention and adjustment mechanism.

12. The rack system of claim 11, wherein the inner clip is configured to be interchangeably received by an inner carriage pivotally mounted to the coupler body and the outer clip is configured to be interchangeably received by an outer carriage pivotally mounted to the coupler body and wherein the inner carriage is configured to rotate relative to the coupler body around an inner pivot axis generally perpendicular to a long axis of the crossbar and the outer carriage is configured to rotate relative to the coupler body around an outer pivot axis generally perpendicular to the long axis of the crossbar.

13. A method of removably attaching a coupling assembly to a flush roof rail of a vehicle, the coupling assembly for use in a rooftop cargo carrying system, the method comprising:
   disposing the coupling assembly on the flush roof rail of the vehicle, the coupling assembly including a base connected to a coupler body, with the base abutting a top side of the flush roof rail;
   removably coupling an inner clip of a set of inner clips to a clip retention and adjustment mechanism connected to the coupler body, the inner clip configured to abut an inner side of the flush roof rail;
   removably coupling an outer clip of a set of outer clips to the clip retention and adjustment mechanism, the outer clip configured to abut an outer side of the flush roof rail; and
   actuating an adjustment member of the clip retention and adjustment mechanism;

wherein actuating the adjustment member includes:
rotating the inner clip relative to the coupler body and toward the outer clip in order to grip the inner side of the flush rail;
rotating the outer clip relative to the coupler body and toward the inner clip in order to grip the outer side of the flush rail; and
wherein removably coupling the inner clip to the clip retention and adjustment mechanism includes inserting the inner clip into an inner carriage of the clip retention and adjustment mechanism, the inner carriage pivotally mounted to the coupler body, and wherein removably coupling the outer clip to the clip retention and adjustment mechanism includes inserting the outer clip into an outer carriage of the clip retention and adjustment mechanism, the outer carriage pivotally mounted to the coupler body.

14. The method of claim 13, further comprising removably coupling the base to the coupler body.

15. The method of claim 13, further comprising coupling a crossbar to the coupling assembly via a crossbar clamp connected to the coupler body, the crossbar having a long axis oriented transverse to a direction of vehicle travel.

16. The method of claim 15, further comprising adjusting a pitch angle of the crossbar relative to the coupler body by rotating the crossbar around the long axis of the crossbar.

* * * * *